United States Patent
Kitazoe et al.

(10) Patent No.: US 9,332,464 B2
(45) Date of Patent: May 3, 2016

(54) METHOD AND APPARATUS THAT FACILITATES MEASUREMENT PROCEDURES IN MULTICARRIER OPERATION

(75) Inventors: Masato Kitazoe, Tokyo (JP); Ravi Palanki, San Diego, CA (US); Tingfang Ji, San Diego, CA (US); Nathan Edward Tenny, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 800 days.

(21) Appl. No.: 12/817,083

(22) Filed: Jun. 16, 2010

(65) Prior Publication Data

US 2010/0322079 A1    Dec. 23, 2010

Related U.S. Application Data

(60) Provisional application No. 61/218,850, filed on Jun. 19, 2009.

(51) Int. Cl.
*H04W 36/00* (2009.01)
*H04W 24/10* (2009.01)

(52) U.S. Cl.
CPC .......... *H04W 36/0088* (2013.01); *H04W 24/10* (2013.01)

(58) Field of Classification Search
USPC .................. 370/312, 329, 331, 338, 343, 428; 455/422.1, 423, 436, 437, 449, 522
See application file for complete search history.

(56) References Cited

U.S. PATENT DOCUMENTS

| 7,313,398 B1* | 12/2007 | Ramahi ................. H04W 24/00 370/329 |
| 2005/0009531 A1* | 1/2005 | Lindquist et al. .......... 455/452.2 |

(Continued)

FOREIGN PATENT DOCUMENTS

| CN | 100499905 C | 6/2009 |
| EP | 0873034 A2 | 10/1998 |

(Continued)

OTHER PUBLICATIONS

International Search Report and Written Opinion—PCT/US2010/039369—International Search Authority, European Patent Office,Jan. 26, 2011.

(Continued)

*Primary Examiner* — Michael Thier
*Assistant Examiner* — Prince A Mensah
(74) *Attorney, Agent, or Firm* — Ke Liu

(57) ABSTRACT

Aspects directed towards measurement procedures in multi-carrier operation are disclosed. In a particular aspect, a wireless terminal selects a subset of cells, which include at least one serving cell and at least one non-serving cell. The subset of cells are then evaluated by obtaining a first measurement associated with the at least one serving cell and a second measurement associated with the at least one non-serving cell. A measurement event occurrence, which is based on a comparison between the first measurement and the second measurement, is then monitored. An occurrence of the measurement event triggers a measurement report transmission, which the network then uses to perform handovers. Other disclosed embodiments are directed towards placing a reception band, which include identifying a set of assigned component carriers and placing a reception band within the system bandwidth so that the placement overlaps with at least a portion of the assigned component carriers.

16 Claims, 18 Drawing Sheets

(56) References Cited

U.S. PATENT DOCUMENTS

| | | | |
|---|---|---|---|
| 2005/0176469 A1* | 8/2005 | Stern-Berkowitz et al. | 455/562.1 |
| 2005/0272425 A1* | 12/2005 | Amerga et al. | 455/436 |
| 2006/0258386 A1* | 11/2006 | Jeong et al. | 455/525 |
| 2007/0105561 A1* | 5/2007 | Doetsch et al. | 455/450 |
| 2007/0105583 A1* | 5/2007 | Gerlach | 455/522 |
| 2008/0102834 A1 | 5/2008 | Bernhard et al. | |
| 2008/0119209 A1* | 5/2008 | Upp | 455/458 |
| 2009/0005029 A1* | 1/2009 | Wang et al. | 455/423 |
| 2009/0046641 A1 | 2/2009 | Wang et al. | |
| 2009/0274123 A1* | 11/2009 | Chang et al. | 370/332 |
| 2010/0039369 A1 | 2/2010 | Kaida | |
| 2010/0087194 A1* | 4/2010 | MacNaughtan et al. | 455/435.2 |

FOREIGN PATENT DOCUMENTS

| | | | | |
|---|---|---|---|---|
| EP | 1758423 A1 | 2/2007 | | |
| JP | 2006222845 A | 8/2006 | | |
| KR | 20090042833 A | 4/2009 | | |
| RU | 2001112983 | 5/2013 | | |
| SE | WO 2009/148381 | * | 12/2009 | H04B 17/00 |
| WO | 0022870 A1 | 4/2000 | | |
| WO | WO2006130063 A1 | 12/2006 | | |
| WO | WO-2007083830 A1 | 7/2007 | | |
| WO | WO2008066086 A1 | 6/2008 | | |
| WO | 2010032675 A1 | 3/2010 | | |
| WO | 2010148403 A2 | 12/2010 | | |

OTHER PUBLICATIONS

Ericsson: "UE Measurement Concept for Intra-Frequency Measurements", TSG-RAN Working Group 2 (Radio layer 2 and Radio layer 3), TSGR2#4(99)419, May 25 to 28, 1999.
Huawei: "Carrier aggregation in active mode", 3GPP TSG-RAN WG2 Meeting #66, R2-093104, May 4-8, 2009.
"IEEE Standard for Local and metropolitan Part 16: Air Interface Broadband Wireless Amendment 2: Physical Control Layers for Operation in Licensed and Corrigendum 1", IEEE, Feb. 28, 2006.
Parts 6.3.2.3.48, 6.3.2.3.49, 6.3.2.3.50, 6.3.2.3.52, 6.3.2.3.53, 6.3.22.1.2, 6.3.22.2, 8.4.6, Table 1091, Table 358a and Table 358b.
Nortel et al., "Measurement configuration and reporting for 3GPP2 cells", 3GPP TSG RAN WG2 #59bis, R2-074369, Oct. 8-12, 2008.
Qualcomm Europe: "Cell Search and Association with Carriers" 3GPP Draft; R2-084403, 3rd Generation Partnership Project (3GPP), Mobile Competence Centre; 650, Route Des Lucioles; F-06921 Sophia-Antipolis Cedex; France, No. Jeju; Aug. 12, 2008, XP050319472 [retrieved on Aug. 12, 2008] paragraph 3 paragraph 4 Figures 1 and 2.
Qualcomm Europe: "RRM Requirements for DC-HSDPA", 3GPP TSG-RAN WG4 Meeting #48, R4-081895, Aug. 18-22, 2008.
Taiwan Search Report—TW099119961—TIPO—May 21, 2013.
Huawei: "Carrier aggregation in Advanced E-UTRA", 3GPP TSG RAN WG1#53bis (R1-082448), Warsaw, Poland, (Jun. 25, 2008), retrieved on Jul. 29, 2013, retrieved at the Internet, http://www.3gpp.org/ftp/tsg_ran/wg1_rl1/TSGR1_53b/Docs/.
"3GPP TR 25.814 V7.1.0, Technical Report, 3rd Generation Partnership Project; Technical Specification Group Radio Access Network; Physical layer aspects for evolved Universal Terrestrial Radio Access (UTRA) (Release 7)" Sep. 1, 2006, XP002511692 Retrieved from the Internet: URL:http://www.3gpp.org/ftp/Specs/archive/25_series/25.814/25814-710.zip>; [retrieved on Jan. 22, 2009].
Nokia Corporation, et al., "Improvements for LTE-Advanced MAC", 3GPP TSG-RAN WG2 Meeting #65bis, R2-092061, pp. 1-3, Mar. 2009, URL, http://www.3gpp.org/ftp/tsg_ran/WG2_RL2/TSGR2_65bis/Docs/R2-092061.zip.
NTT DoCoMo: "Initial Access Procedure for Asymmetric Wider Bandwidth in LTE-Advanced," 3GPP TSG RAN WG1 Meeting #54bis, R1-083680, Prague, Czech Republic, Sep. 29-Oct. 3, 2008, pp. 1-5.
LG Electronics Inc., "Discussion on Measurement for CA," 3GPP TSG-RAN WG2 #66bis, R2-093877, Jun. 23, 2009.
Mogensen P.E., et al., "LTE-Advanced: The path towards gigabit/s in wireless mobile communications," 1st International Conference on Wireless Communication, Vehicular Technology, Information Theory and Aerospace & Electronic Systems Technology, May 17-20, 2009, Left Column of p. 151, Figs. 1 and 5.
Taiwan Search Report—TW102130614—TIPO—Dec. 11, 2014.

* cited by examiner

METHOD AND APPARATUS THAT FACILITATES MEASUREMENT PROCEDURES IN MULTICARRIER OPERATION

CROSS-REFERENCE TO RELATED APPLICATIONS

This application claims the benefit of U.S. Provisional Patent Application Ser. No. 61/218,850 entitled "Measurement Procedures in Multicarrier Operation," which was filed Jun. 19, 2009. The aforementioned application is herein incorporated by reference in its entirety.

BACKGROUND

I. Field

The following description relates generally to wireless communications, and more particularly to methods and apparatuses that facilitate measurement procedures in multicarrier operation.

II. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

With respect to LTE-Advanced (LTE-A) systems, it is noted that existing LTE Release-8 measurement procedures do not adequately address the requirements and constraints associated with multicarrier operation. Moreover, it is noted that existing measurement procedures for LTE Release-8 are directed towards single carrier operation, which may be inadequate for measurement report triggering resulting from comparisons performed during multicarrier operation. A method and apparatus for performing efficient measurement procedures to facilitate handovers to appropriate cells during multicarrier operation is thus desirable.

The above-described deficiencies of current wireless communication systems are merely intended to provide an overview of some of the problems of conventional systems, and are not intended to be exhaustive. Other problems with conventional systems and corresponding benefits of the various non-limiting embodiments described herein may become further apparent upon review of the following description.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with measurement procedures in multicarrier operation. In one aspect, methods and computer program products are disclosed that facilitate performing measurements in multicarrier operation. These embodiments include selecting a subset of cells from a plurality of cells, wherein the subset of cells includes at least one serving cell and at least one non-serving cell. These embodiments further include evaluating the subset of cells by obtaining a first measurement associated with the at least one serving cell and a second measurement associated with the at least one non-serving cell. An occurrence of a measurement event based on a comparison between the first measurement and the second measurement is then monitored. A measurement report is then transmitted, wherein the transmitting of the measurement report is triggered by the occurrence of the measurement event.

In another aspect, an apparatus configured to facilitate performing measurements in multicarrier operation is disclosed. Within such embodiment, the apparatus includes a processor configured to execute computer executable components stored in memory. The computer executable components include a selection component, an evaluation component, an event component, and a communication component. The selection component is configured to select a subset of cells from a plurality of cells, wherein the subset of cells includes at least one serving cell and at least one non-serving cell. The evaluation component is then configured to evaluate the subset of cells based on a first measurement and a second measurement, wherein the first measurement is associated with the at least one serving cell, and wherein the second measurement is associated with the at least one non-serving cell. For this embodiment, the event component is configured to monitor an occurrence of a measurement event, wherein the measurement event is based on a comparison between the first measurement and the second measurement. The communication component is then configured to transmit a measurement report, wherein a transmission of the measurement report is triggered by the occurrence of the measurement event.

In a further aspect, another apparatus is disclosed. Within such embodiment, the apparatus includes means for selecting, means for evaluating, means for monitoring, and means for transmitting. For this embodiment, the means for selecting selects a subset of cells from a plurality of cells, wherein the subset of cells includes at least one serving cell and at least one non-serving cell. The means for evaluating then evaluates the subset of cells based on a first measurement associated with the at least one serving cell and a second measurement associated with the at least one non-serving cell, whereas the means for monitoring monitors an occurrence of a measurement event, wherein the measurement event is based on a comparison between the first measurement and the second measurement. The means for transmitting then transmits a measurement report, wherein a transmission of the measurement report is triggered by the occurrence of the measurement event.

In another aspect, methods and computer program products are disclosed for performing handovers in multicarrier operation. For these embodiments, various acts are provided, including an act to receive a measurement report associated with an occurrence of a measurement event from a wireless terminal. Here, the measurement event is based on a comparison between a first measurement associated with at least one serving cell and a second measurement associated with at least one non-serving cell. These embodiments further ascertaining a cell selection scheme associated with the measurement report, wherein the cell selection scheme indicates a set of serving cells associated with the wireless terminal from which the at least one serving cell was selected and a set of non-serving cells from which the at least one non-serving cell was selected. A handover is then performed based on the occurrence and the cell selection scheme.

An apparatus for performing handovers in multicarrier operation is also disclosed. Within such embodiment, the apparatus includes a processor configured to execute computer executable components stored in memory. The computer executable components include a communication component, a scheme component, and a handover component. The communication component is configured to receive a measurement report associated with an occurrence of a measurement event from a wireless terminal. For this embodiment, the measurement event is based on a comparison between a first measurement associated with at least one serving cell and a second measurement associated with at least one non-serving cell. Furthermore, the scheme component is configured to ascertain a cell selection scheme associated with the measurement report, wherein the cell selection scheme indicates a set of serving cells associated with the wireless terminal from which the at least one serving cell was selected and a set of non-serving cells from which the at least one non-serving cell was selected. The handover component is then configured to perform a handover based on the occurrence and the cell selection scheme.

In a further aspect, another apparatus is disclosed. Within such embodiment, the apparatus includes means for receiving, means for ascertaining, and means for performing. For this embodiment, the means for receiving receives a measurement report associated with an occurrence of a measurement event from a wireless terminal, wherein the measurement event is based on a comparison between a first measurement associated with at least one serving cell and a second measurement associated with at least one non-serving cell. The means for ascertaining then ascertains a cell selection scheme associated with the measurement report. Here, the cell selection scheme indicates a set of serving cells associated with the wireless terminal from which the at least one serving cell was selected and a set of non-serving cells from which the at least one non-serving cell was selected. The means for performing then performs a handover based on the occurrence and the cell selection scheme.

In other aspects, methods and computer program products are disclosed that facilitate placing a reception band. These embodiments include identifying a set of assigned component carriers from a plurality of component carriers, wherein a system bandwidth comprises the plurality of component carriers. A placement of the reception band within the system bandwidth is then ascertained. For these embodiments, the placement is configured to overlap with at least a portion of the set of assigned component carriers.

An apparatus configured to facilitate placing a reception band is also disclosed. Within such embodiment, the apparatus includes a processor configured to execute computer executable components stored in memory. The computer executable components include an assignment component and a placement component. The assignment component is configured to identify at least one assigned component carrier from a plurality of component carriers, wherein a system bandwidth comprises the plurality of component carriers. The placement component is then configured to ascertain a placement of the reception band within the system bandwidth. For this embodiment, the placement is configured to overlap with at least a portion of the at least one assigned component carrier.

In a further aspect, another apparatus is disclosed. Within such embodiment, the apparatus includes means for identifying and means for ascertaining. The means for identifying identifies a set of assigned component carriers from a plurality of component carriers, wherein a system bandwidth comprises the plurality of component carriers. The means for ascertaining then ascertains a placement of the reception band within the system bandwidth, wherein the placement is configured to overlap with at least a portion of the set of assigned component carriers.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
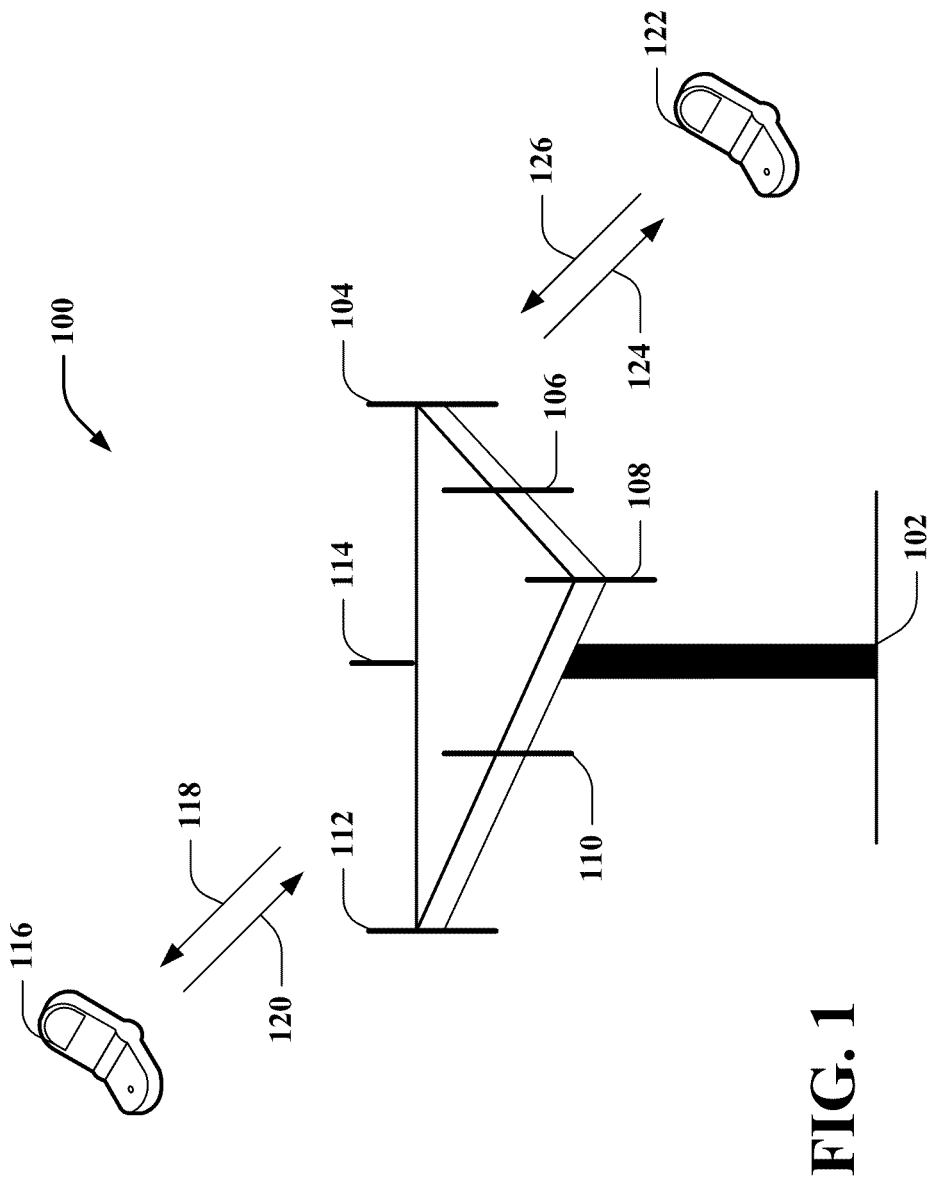
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

The subject specification is directed towards measurement procedures performed during multicarrier operation. Moreover, exemplary embodiments are disclosed which facilitate performing efficient measurement procedures to facilitate handovers to appropriate cells during multicarrier operation. Exemplary embodiments are also provided, which facilitate strategically placing a reception band for multicarrier operation.

To this end, it is noted that the techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA), High Speed Packet Access (HSPA), and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink.

Single carrier frequency division multiple access (SC-FDMA) utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits access terminals in terms of transmit power efficiency. Accordingly, SC-FDMA can be implemented as an uplink multiple access scheme in 3GPP Long Term Evolution (LTE) or Evolved UTRA.

High speed packet access (HSPA) can include high speed downlink packet access (HSDPA) technology and high speed uplink packet access (HSUPA) or enhanced uplink (EUL) technology and can also include HSPA+ technology. HSDPA, HSUPA and HSPA+ are part of the Third Generation Partnership Project (3GPP) specifications Release 5, Release 6, and Release 7, respectively.

High speed downlink packet access (HSDPA) optimizes data transmission from the network to the user equipment (UE). As used herein, transmission from the network to the user equipment can be referred to as the "downlink" (DL). Transmission methods can allow data rates of several Mbits/s. High speed downlink packet access (HSDPA) can increase the capacity of mobile radio networks. High speed uplink packet access (HSUPA) can optimize data transmission from the terminal to the network. As used herein, transmissions from the terminal to the network can be referred to as the "uplink" (UL). Uplink data transmission methods can allow data rates of several Mbit/s. HSPA+ provides even further improvements both in the uplink and downlink as specified in Release 7 of the 3GPP specification. High speed packet access (HSPA) methods typically allow for faster interactions between the downlink and the uplink in data services transmitting large volumes of data, for instance Voice over IP (VoIP), videoconferencing and mobile office applications Fast data transmission protocols such as hybrid automatic repeat request, (HARQ) can be used on the uplink and downlink. Such protocols, such as hybrid automatic repeat request (HARQ), allow a recipient to automatically request retransmission of a packet that might have been received in error.

Various embodiments are described herein in connection with an access terminal. An access terminal can also be called a system, subscriber unit, subscriber station, mobile station, mobile, remote station, remote terminal, mobile device, user terminal, terminal, wireless communication device, user agent, user device, or user equipment (UE). An access terminal can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem.

Moreover, various embodiments are described herein in connection with a base station. A base station can be utilized for communicating with access terminal(s) and can also be referred to as an access point, Node B, Evolved Node B (eNodeB), access point base station, or some other terminology.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more access terminals such as access terminal 116 and access terminal 122; however, it is to be appreciated that base station 102 can communicate with substantially any number of access terminals similar to access terminals 116 and 122. Access terminals 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, access terminal 116 is in communication with antennas 112 and 114, where antennas 112 and 114 transmit information to access terminal 116 over a forward link 118 and receive information from access terminal 116 over a reverse link 120. Moreover, access terminal 122 is in communication with antennas 104 and 106, where antennas 104 and 106 transmit information to access terminal 122 over a forward link 124 and receive information from access terminal 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to access terminals in a sector of the areas covered by base station 102. In communication over forward links 118 and 124, the transmitting antennas of base station 102 can utilize beamforming to improve signal-to-noise ratio of forward links 118 and 124 for access terminals 116 and 122. Also, while base station 102 utilizes beamforming to transmit to access terminals 116 and 122 scattered randomly through an associated coverage, access terminals in neighboring cells can be subject to less interference as compared to a base station transmitting through a single antenna to all its access terminals.

Figure 2:
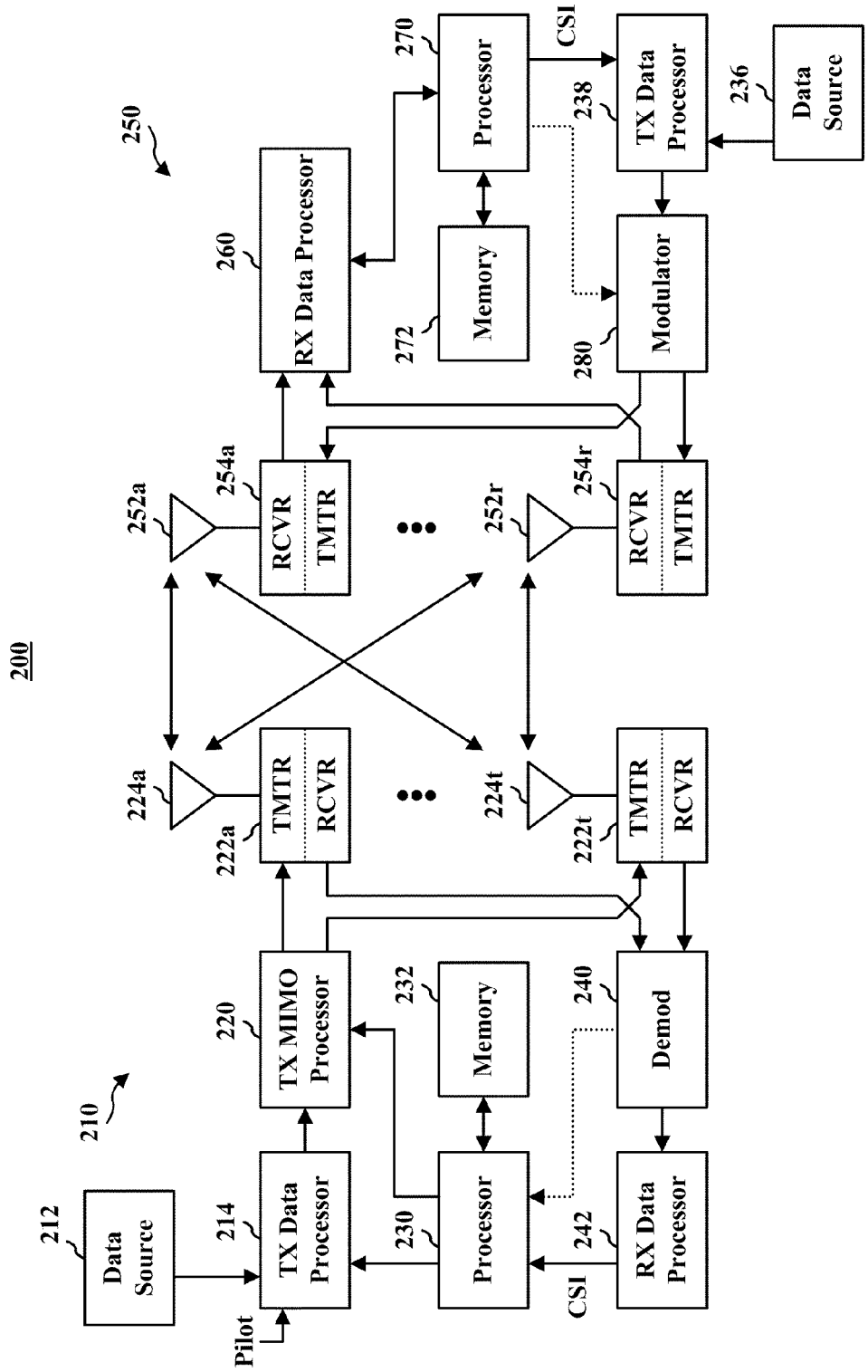
FIG. 2 is an illustration of an exemplary wireless network environment that can be employed in conjunction with the various systems and methods described herein.

FIG. 2 shows an example wireless communication system 200. The wireless communication system 200 depicts one base station 210 and one access terminal 250 for sake of brevity. However, it is to be appreciated that system 200 can include more than one base station and/or more than one access terminal, wherein additional base stations and/or access terminals can be substantially similar or different from example base station 210 and access terminal 250 described below. In addition, it is to be appreciated that base station 210 and/or access terminal 250 can employ the systems and/or methods described herein to facilitate wireless communication there between.

At base station 210, traffic data for a number of data streams is provided from a data source 212 to a transmit (TX) data processor 214. According to an example, each data stream can be transmitted over a respective antenna. TX data processor 214 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at access terminal 250 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 230.

The modulation symbols for the data streams can be provided to a TX MIMO processor 220, which can further process the modulation symbols (e.g., for OFDM). TX MIMO processor 220 then provides $N_T$ modulation symbol streams to $N_T$ transmitters (TMTR) 222a through 222t. In various embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 222a through 222t are transmitted from $N_T$ antennas 224a through 224t, respectively.

At access terminal 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective signal, digitizes the conditioned signal to provide samples, and further processes the samples to provide a corresponding "received" symbol stream.

An RX data processor 260 can receive and process the $N_R$ received symbol streams from $N_R$ receivers 254 based on a particular receiver processing technique to provide $N_T$ "detected" symbol streams. RX data processor 260 can demodulate, deinterleave, and decode each detected symbol stream to recover the traffic data for the data stream. The processing by RX data processor 260 is complementary to that performed by TX MIMO processor 220 and TX data processor 214 at base station 210.

A processor 270 can periodically determine which available technology to utilize as discussed above. Further, processor 270 can formulate a reverse link message comprising a matrix index portion and a rank value portion.

The reverse link message can comprise various types of information regarding the communication link and/or the received data stream. The reverse link message can be processed by a TX data processor 238, which also receives traffic data for a number of data streams from a data source 236, modulated by a modulator 280, conditioned by transmitters 254a through 254r, and transmitted back to base station 210.

At base station 210, the modulated signals from access terminal 250 are received by antennas 224, conditioned by receivers 222, demodulated by a demodulator 240, and processed by a RX data processor 242 to extract the reverse link message transmitted by access terminal 250. Further, processor 230 can process the extracted message to determine which precoding matrix to use for determining the beamforming weights.

Processors 230 and 270 can direct (e.g., control, coordinate, manage, etc.) operation at base station 210 and access terminal 250, respectively. Respective processors 230 and 270 can be associated with memory 232 and 272 that store program codes and data. Processors 230 and 270 can also perform computations to derive frequency and impulse response estimates for the uplink and downlink, respectively.

In designing measurement procedures for multicarrier operation, it is noted that baseline definitions related to existing measurement subsystems may change. Moreover, the subject specification contemplates that additional measurement procedures may be needed in order to address the architectural requirements and constraints of multicarrier operation.

Figure 3:
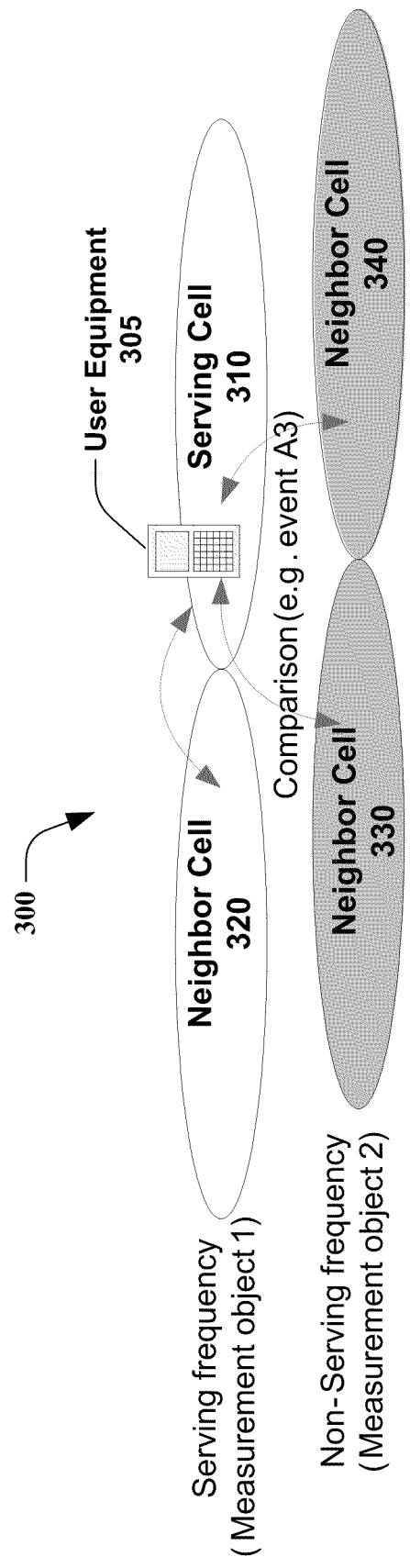
FIG. 3 is an illustration of an exemplary architecture for performing measurements in single carrier operation.

Referring next to FIG. 3, an exemplary measurement architecture for single-carrier operation (e.g., 3GPP LTE Release-8) is provided. As illustrated, architecture 300 includes serving cell 310, which serves user equipment 305 and facilitates a single carrier operation of user equipment 305 at a particular serving frequency. Architecture 300 further includes neighbor cells 320, 330, and 340, wherein user equipment 305 detects a signal transmitted by neighbor cell 320 via the serving frequency, and wherein user equipment 305 detects signals transmitted by neighbor cells 330 and 340 via non-serving frequencies.

With respect to measurement procedures for single-carrier operation (e.g., 3GPP LTE Release 8), the following list of measurement procedure definitions currently apply to architecture 300. First, the frequency of serving cell 310 is the "intra-frequency/serving frequency," whereas all other frequencies are "inter-frequency/non-serving frequency". Each frequency is equally treated as a "measurement object". Certain measurement reporting events (e.g. a neighbor cell becomes offset better than serving cell) can be configured for each measurement object. Here, it is noted that serving cell 310 is distinguished from neighbor cells 320, 330, and 340 (e.g., a measurement reporting event may correspond to "Neighbor cell 330 becomes offset better than serving cell 310"). Also, depending on the capability of user equipment 305, inter-frequency measurements may require a measurement gap for measurements based on frequency re-tuning.

Multi-carrier operation is characterized by having multiple serving cells from different component carriers. To this end, given the above single-carrier definitions and architecture, at least the following principles are contemplated for multicarrier operation. First, multiple serving frequencies/intra-frequencies can be associated with the serving cells. And second, each component carrier is a measurement object.

Figure 4:
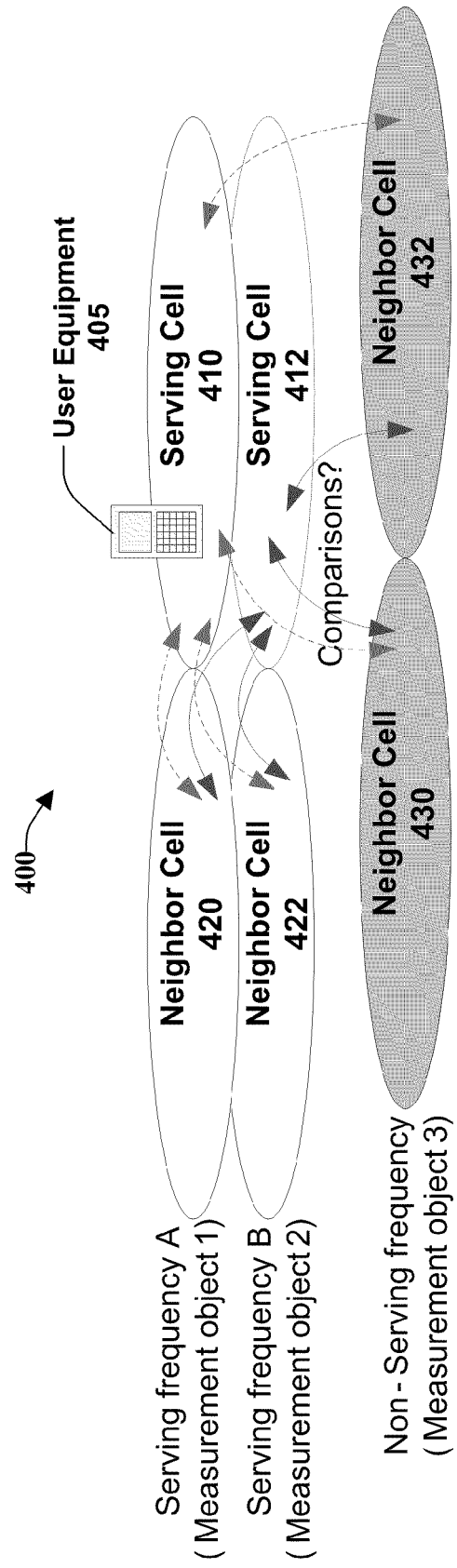
FIG. 4 is an illustration of an exemplary architecture for performing measurements in multicarrier operation according to an embodiment.

Referring next to FIG. 4, an exemplary measurement architecture for multicarrier operation (e.g., LTE-A) is provided. As illustrated, architecture 400 includes serving cells 410 and 412, which respectively serve user equipment 405 and facilitate a multicarrier operation of user equipment 405 via multiple serving frequencies. Architecture 400 further includes neighbor cells 420, 422, 430, and 432, wherein user equipment 405 detects signals respectively transmitted by neighbor cells 420 and 422 via the serving frequencies, and wherein user equipment 405 also detects signals transmitted by neighbor cells 430 and 432 via non-serving frequencies.

Here, it is noted that single carrier measurement procedures are inadequate for multicarrier operation since it is not immediately clear how comparisons for measurement report triggering should be done. Moreover, it is noted that simply applying conventional single carrier definitions to architecture 400 would result in a larger number of combinations for comparison as shown in FIG. 4. Indeed, it is not clear if all the serving cells 410 and 412 need to be compared with neighbor cells 420, 422, 430, and 432 indicated by a particular measurement object.

Figure 5:
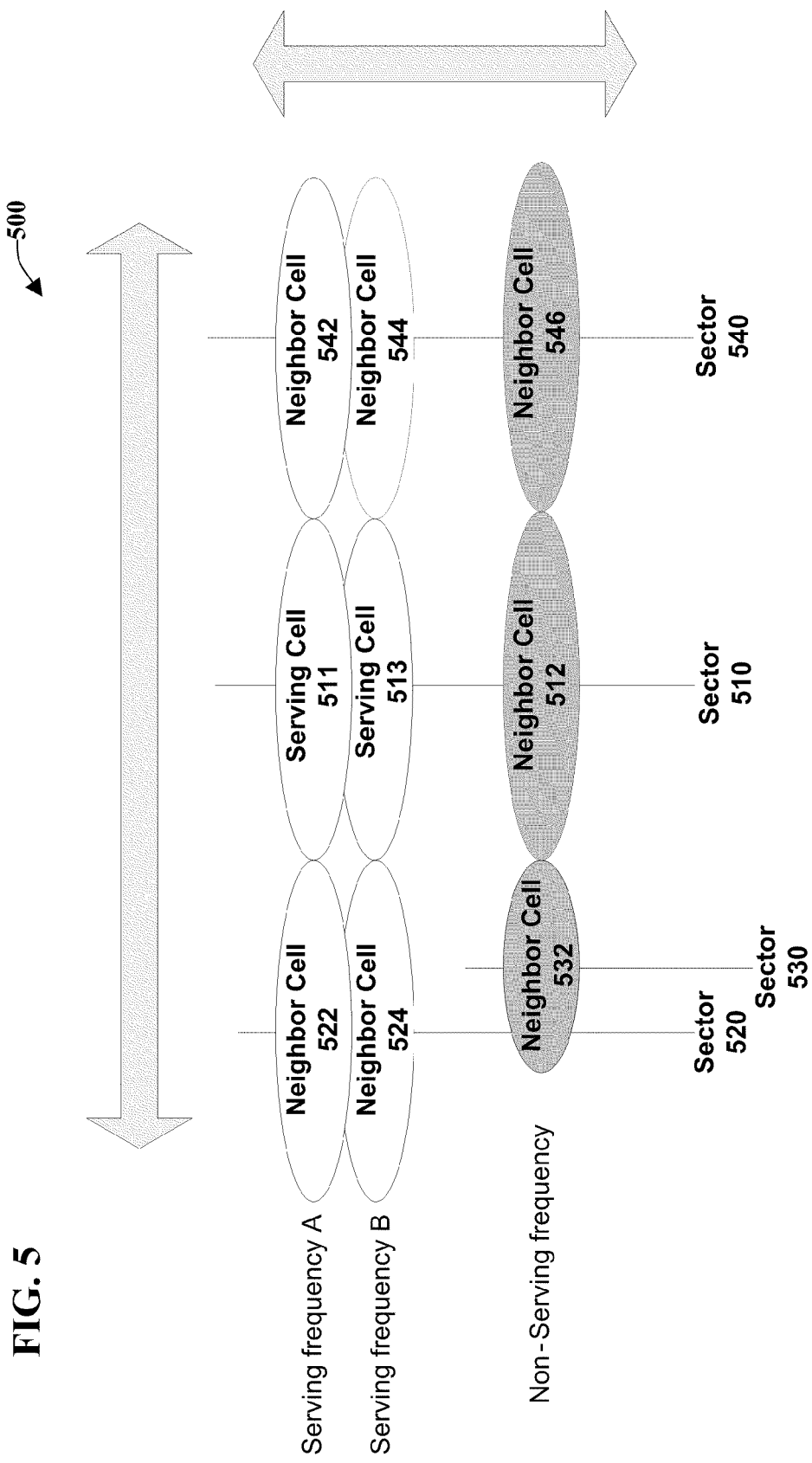
FIG. 5 is an illustration of an exemplary architecture that facilitates performing vertical and horizontal handovers in multicarrier operation according to an embodiment.

In multicarrier operation, it should be appreciated that the serving cell set may include cells that have overlapping coverage and are from the same cell-site, wherein such set of cells will be referred to as a "sector" herein. In an aspect, as illustrated in FIG. 5, "vertical" and "horizontal" mobility are contemplated, wherein a "vertical" handover refers to changing serving cells within a sector, and wherein a "horizontal" handover refers to a change in sector. For this particular example, multicarrier architecture 500 includes sectors 510, 520, 530, and 540, as shown. Specifically, sector 510 includes serving cells 511 and 513 and neighbor cell 512, wherein serving cells 511 and 513 respectively transmit signals via serving frequencies A and B, and wherein neighbor cell 512 transmits a signal via a non-serving frequency. Furthermore, sector 520 includes neighbor cells 522 and 524, sector 530 includes neighbor cell 532, and sector 540 includes neighbor cells 542, 544, and 546. For this particular example, as illustrated, each of neighbor cells 522 and 542 transmit a signal via serving frequency A, whereas each of neighbor cells 524 and 544 transmit a signal via serving frequency B. Each of neighbor cells 512, 532, and 546 then transmit signals via a non-serving frequency.

In an aspect, horizontal handovers are primarily controlled by the "connect to the best cell on the frequency" principle. Within such embodiment, it is therefore desirable for intra-frequencies to have a specific measurement event where only the serving cell of the frequency indicated by the measurement object is evaluated. This would also make the network aware of adverse interference conditions on each carrier. It is contemplated that implementing such a scheme can be achieved by, for example, having a flag indicating the above restriction, and/or changing the definition of "serving cell" for measurement events in multicarrier operation. Namely, in a first aspect, a flag can be added in measurement configuration indicating that in measurement event evaluations the UE shall only consider the serving cell of the frequency indicated by the measurement object (wherein this is only applicable to intra-frequency measurements). In a second aspect, however, rather than relying on a particular indicator in the measurement configuration, the UE is already pre-configured to only consider the serving cell of the frequency indicated by the measurement object for intra-frequency measurement event evaluations in multicarrier operation.

With respect to vertical handovers, it is noted that such handovers can be triggered when a neighbor cell from a non-serving frequency is deemed to be of better quality than a serving cell. With 3GPP LTE Release-8 measurement configurations, the UE is not aware of either horizontal or vertical cells for non-serving frequencies. Accordingly, a particular embodiment is contemplated for measurement evaluations of non-serving frequencies wherein the UE considers all the serving cells in the event evaluation, which desirably facilitates network control of vertical handovers.

Further optimizations to reduce the number of UE measurement reports are also contemplated. For instance, the UE could send a measurement report only once when a neighbor cell becomes better than one of the serving cells (i.e. another measurement report is not sent when the same neighbor cell becomes better than another serving cell). To facilitate such optimization, a new event can be defined such as "Neighbor cell becomes offset better than one of the serving cells."

It is further contemplated that the UE could be made aware of its vertical neighbor cells. For instance, a new event can be defined such as "Vertical neighbor cell becomes offset better than one of the serving cells." Within such embodiment, a new physical layer signal (e.g. Physical Cell Identity) may be defined, wherein such signal is capable of indicating a sector identity. In another embodiment, neighbor cells from the same sector can be listed as the measurement target cells in the measurement configuration.

Figure 6:
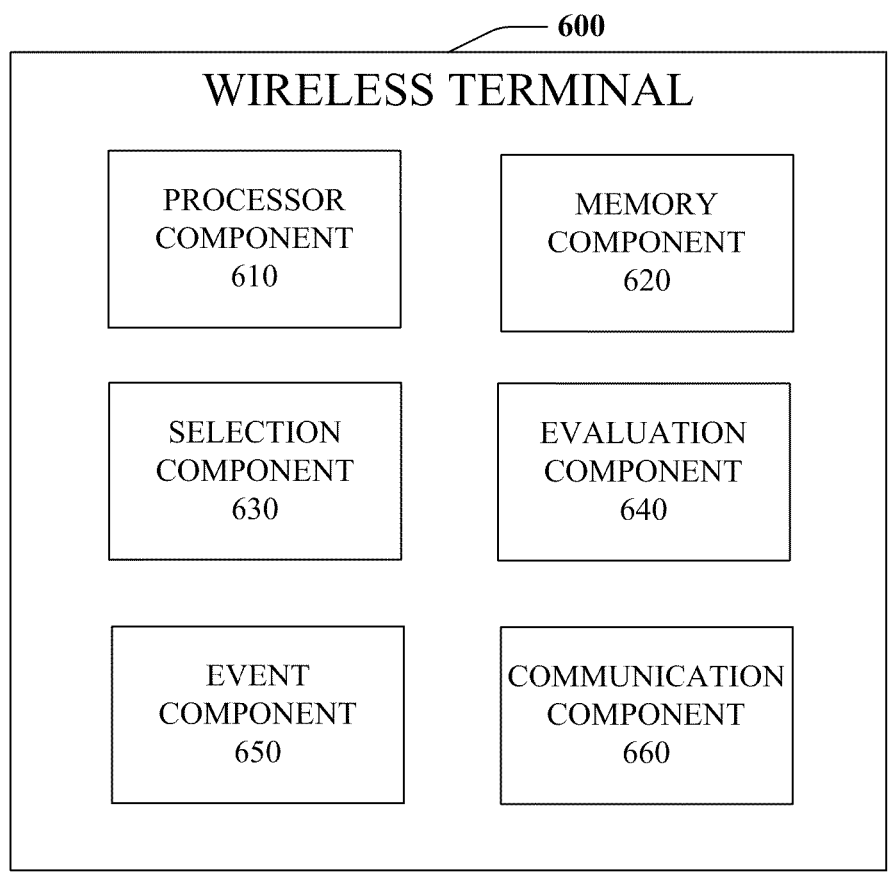
FIG. 6 illustrates a block diagram of an exemplary wireless terminal that facilitates performing measurements in multicarrier operation in accordance with an aspect of the subject specification.

Referring next to FIG. 6, a block diagram of an exemplary wireless terminal that facilitates performing measurements in multicarrier operation according to an embodiment is provided. As shown, wireless terminal 600 may include processor component 610, memory component 620, selection component 630, evaluation component 640, event component 650, and communication component 660.

In one aspect, processor component 610 is configured to execute computer-readable instructions related to performing any of a plurality of functions. Processor component 610 can be a single processor or a plurality of processors dedicated to analyzing information to be communicated from wireless terminal 600 and/or generating information that can be utilized by memory component 620, selection component 630, evaluation component 640, event component 650, and/or communication component 660. Additionally or alternatively, processor component 610 may be configured to control one or more components of wireless terminal 600.

In another aspect, memory component 620 is coupled to processor component 610 and configured to store computer-readable instructions executed by processor component 610. Memory component 620 may also be configured to store any of a plurality of other types of data including data generated by any of selection component 630, evaluation component 640, event component 650, and/or communication component 660. Memory component 620 can be configured in a number of different configurations, including as random access memory, battery-backed memory, hard disk, magnetic tape, etc. Various features can also be implemented upon memory component 620, such as compression and automatic back up (e.g., use of a Redundant Array of Independent Drives configuration).

As illustrated, wireless terminal 600 may also include selection component 630. Within such embodiment, selection component 630 is configured to select a subset of cells from a plurality of cells, wherein the subset of cells includes at least one serving cell and at least one non-serving cell. In an aspect, to facilitate horizontal handovers, evaluation component 640 is configured to analyze the subset of cells on a particular serving frequency, wherein selection component 630 is configured to limit the at least one serving cell to be a single serving cell associated with the particular serving frequency utilized by evaluation component 640. For this particular embodiment, it should also be noted that the at least one non-serving cell is associated with the particular serving frequency. Furthermore, selection component 630 may be configured to determine the subset of cells in response to a measurement configuration received from an external entity. For example, wireless terminal 600 may receive a measurement configuration from a base station, wherein the measurement configuration includes a flag indicating that in a measurement event evaluation the UE shall only consider the serving cell of the frequency indicated by a particular measurement object.

In another aspect, selection component 630 is configured to facilitate vertical handovers by having the at least one serving cell selected from any of a set of serving cells associated with wireless terminal 600, and having the at least one non-serving cell selected from any of a set of non-serving cells associated with a non-serving frequency. In a particular embodiment, selection component 630 may be configured to limit the at least one non-serving cell to be selected from a pre-determined subset of the set of non-serving cells.

In another embodiment, to reduce the number of UE measurement reports, event component 650 may be configured to detect a subsequent occurrence of a measurement event. Namely, such procedure may include detecting an occurrence of a first performance parameter associated with the at least one non-serving cell exceeding a second performance parameter associated with any of the set of serving cells. Upon detecting the subsequent event occurrence, a suppressing operation may be performed, wherein the transmission of superfluous measurement reports are suppressed. Specifically, communication component 660 may be configured to suppress a subsequent measurement report transmission associated with the subsequent occurrence.

As illustrated, wireless terminal 600 may further include evaluation component 640. In an aspect, evaluation component 640 is configured to evaluate the subset of cells based on a first measurement and a second measurement. For this particular embodiment, the first measurement is associated with the at least one serving cell, whereas the second measurement is associated with the at least one non-serving cell.

Wireless terminal 600 may also include event component 650. Within such embodiment, event component 650 is configured to monitor an occurrence of a measurement event, wherein such measurement events are based on a comparison between the first measurement and the second measurement. In an aspect, in order to reduce the number of UE measurement reports for vertical handover consideration, event component 650 may be configured to detect a subsequent occurrence of a first performance parameter associated with the at least one non-serving cell exceeding a second performance parameter associated with any of the set of serving cells. Communication component 660 may then be configured to suppress a subsequent measurement report transmission associated with the subsequent occurrence.

In an aspect, event component 650 may also be configured to identify the at least one non-serving cell. For instance, in a first embodiment, event component 650 may be configured to ascertain a sector identity from a signal for cell identification. In another embodiment, event component 650 may be configured to detect a listing of the at least one non-serving cell in a measurement configuration received from an external entity (e.g., a base station).

In yet another aspect, wireless terminal 600 includes communication component 660, which is configured to interface wireless terminal 600 with external entities. For instance, communication component 660 may be configured to transmit a measurement report to an external entity (e.g., a base station). Within such embodiment, a transmission of the measurement report is triggered by the occurrence of particular measurement events.

Figure 7:
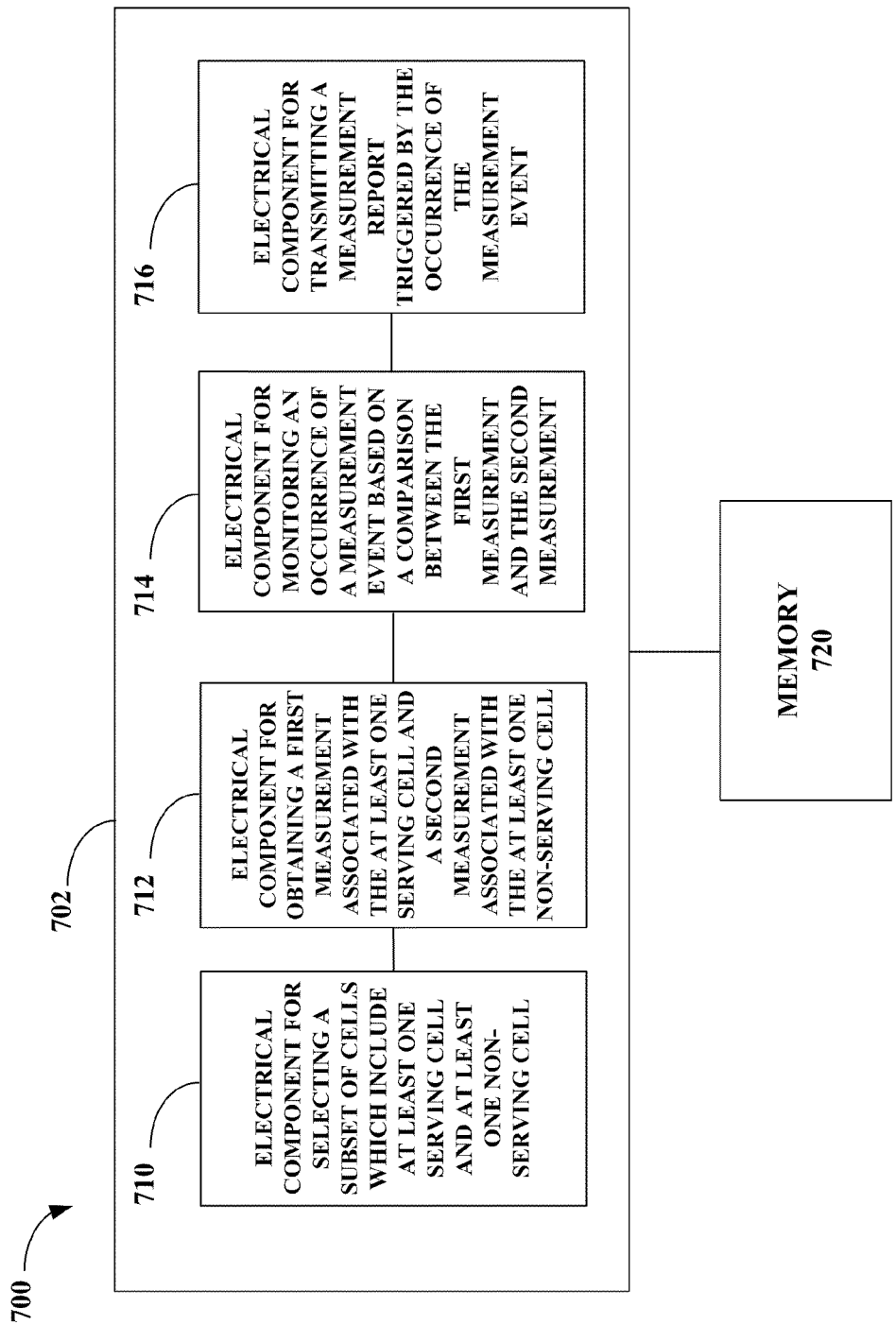
FIG. 7 is an illustration of an exemplary coupling of electrical components that effectuate performing measurements in multicarrier operation.

Turning to FIG. 7, illustrated is a system 700 that facilitates performing measurements in multicarrier operation according to an embodiment. System 700 and/or instructions for implementing system 700 can reside within user equipment (e.g., wireless terminal 600) or a computer-readable storage medium, for instance. As depicted, system 700 includes functional blocks that can represent functions implemented by a processor, software, or combination thereof (e.g., firmware). System 700 includes a logical grouping 702 of electrical components that can act in conjunction. As illustrated, logical grouping 702 can include an electrical component for selecting a subset of cells which include at least one serving cell and at least one non-serving cell 710, as well as an electrical component for obtaining a first measurement associated with the at least one serving cell and a second measurement associated with the at least one non-serving cell 712. Logical grouping 702 can also include an electrical component for monitoring an occurrence of a measurement event based on a comparison between the first measurement and the second measurement 714. Further, logical grouping 702 can include an electrical component for transmitting a measurement report triggered by the occurrence of the measurement event 716. Additionally, system 700 can include a memory 720 that retains instructions for executing functions associated with electrical components 710, 712, 714, and 716. While shown as being external to memory 720, it is to be understood that electrical components 710, 712, 714, and 716 can exist within memory 720.

Figure 8:
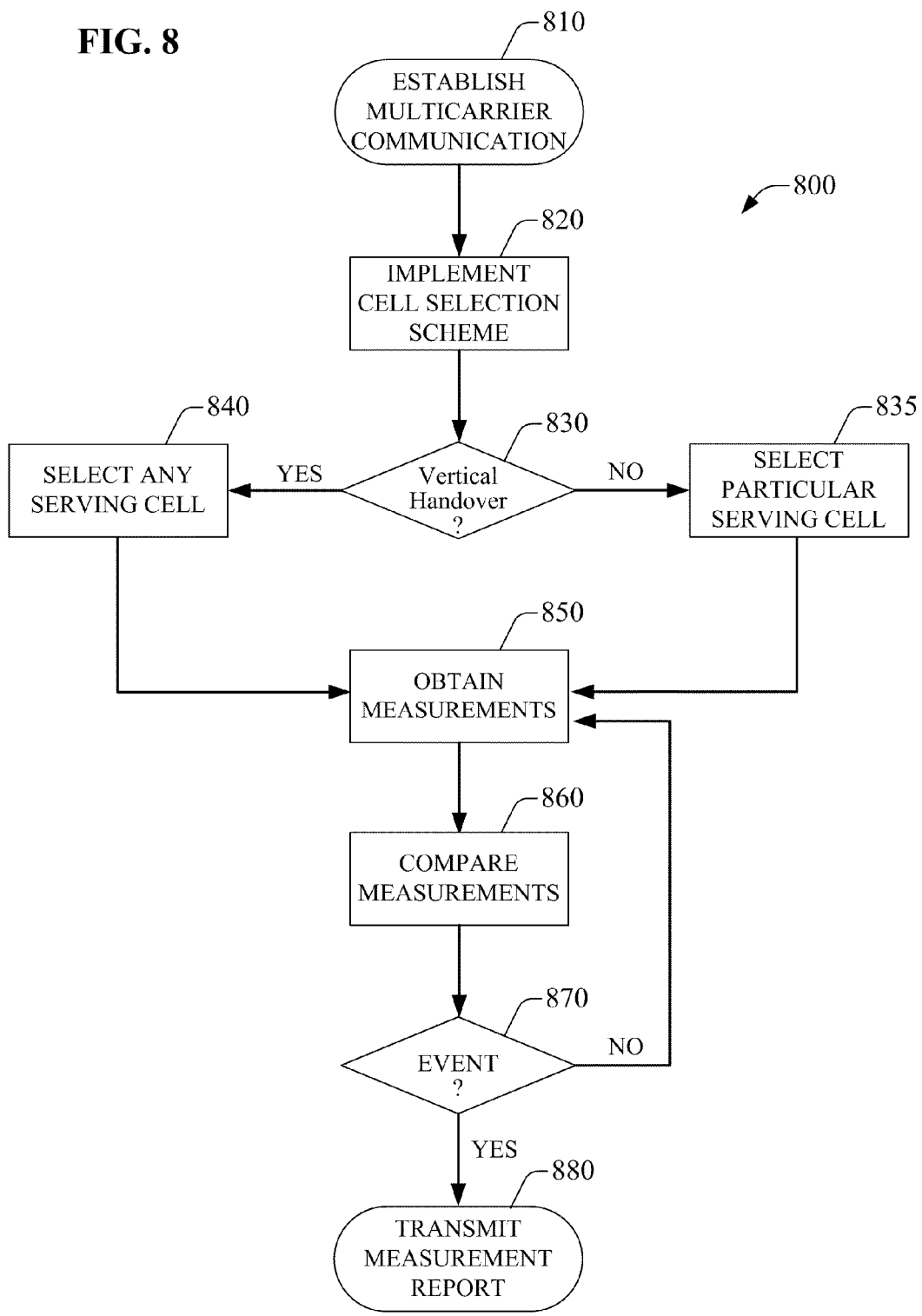
FIG. 8 is a flow chart illustrating an exemplary methodology that facilitates performing measurements in multicarrier operation in accordance with an aspect of the subject specification.

Referring next to FIG. 8, a flow chart illustrating an exemplary method that facilitates performing measurements in multicarrier operation is provided. As illustrated, process 800 includes a series of acts that may be performed by various components of a user equipment (e.g., wireless terminal 600) according to an aspect of the subject specification. Process 800 may be implemented by employing at least one processor to execute computer executable instructions stored on a computer readable storage medium to implement the series of acts. In another embodiment, a computer-readable storage medium comprising code for causing at least one computer to implement the acts of process 800 are contemplated.

In an aspect, process 800 begins with the wireless terminal establishing a multicarrier communication via a plurality of cells at act 810. Next, at act 820, the wireless terminal implements a particular cell selection scheme for selecting a subset of the plurality of cells to monitor. Here, it should be noted that such cell selection scheme may be provided by the network via a measurement configuration, and/or the wireless terminal may be pre-configured to monitor particular cells.

At act 830, process 800 proceeds with a determination of whether the implemented cell selection scheme corresponds with a vertical handover cell selection scheme. If so, any of a plurality of serving cells, which respectively serve the wireless terminal via any of a plurality of serving frequencies, can be selected at act 840. Otherwise, if the cell selection scheme corresponds to a horizontal handover cell selection scheme, a single serving cell corresponding to a particular serving frequency is selected at act 835.

Once the appropriate serving cell(s) is/are selected, process 800 proceeds to act 850 where measurements of the serving cell(s) and non-serving cell(s) are obtained. Here, it should be noted that at least one measurement is associated with a serving cell, and at least one measurement is associated with a non-serving cell. At act 860, the at least one serving cell measurement is compared to the at least one non-serving cell measurement to facilitate determining, at act 870, whether a measurement event has occurred. If an event has indeed been detected, process 800 concludes with a transmission of a measurement report, at act 880, indicating an occurrence of the detected event. Otherwise, if no event is detected, process 800 loops back to act 850 where measurements continue to be obtained.

Figure 9:
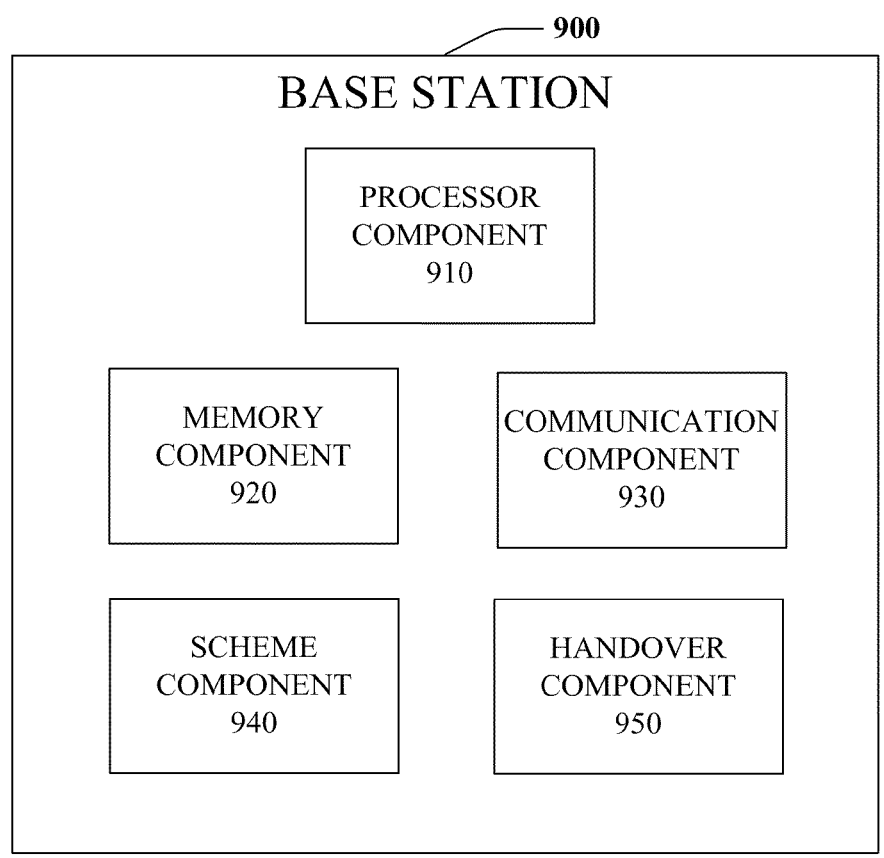
FIG. 9 illustrates a block diagram of an exemplary base station that facilitates performing handovers in multicarrier operation in accordance with an aspect of the subject specification.

Referring next to FIG. 9, a block diagram illustrates an exemplary base station that facilitates performing handovers in multicarrier operation in accordance with various aspects. As illustrated, base station 900 may include processor component 910, memory component 920, communication component 930, scheme component 940, and handover component 950.

Similar to processor component 610 in wireless terminal 600, processor component 910 is configured to execute computer-readable instructions related to performing any of a plurality of functions. Processor component 910 can be a single processor or a plurality of processors dedicated to analyzing information to be communicated from base station 900 and/or generating information that can be utilized by memory component 920, communication component 930, scheme component 940, and/or handover component 950. Additionally or alternatively, processor component 910 may be configured to control one or more components of base station 900.

In another aspect, memory component 920 is coupled to processor component 910 and configured to store computer-readable instructions executed by processor component 910. Memory component 920 may also be configured to store any of a plurality of other types of data including data generated by any of communication component 930, scheme component 940, and/or handover component 950. Here, it should be noted that memory component 920 is analogous to memory component 620 in wireless terminal 600. Accordingly, it should be appreciated that any of the aforementioned features/configurations of memory component 620 are also applicable to memory component 920.

In yet another aspect, base station 900 includes communication component 930, which is also coupled to processor component 910 and configured to interface base station 900 with external entities. For instance, communication component 930 may be configured to receive a measurement report associated with an occurrence of a measurement event from a wireless terminal (e.g., wireless terminal 600). Within such embodiment, measurement events are based on a comparison between a first measurement associated with at least one serving cell and a second measurement associated with at least one non-serving cell.

As illustrated, base station 900 may further include scheme component 940 and handover component 950. Within such embodiment, scheme component 940 is configured to ascertain a cell selection scheme associated with the measurement report received from the wireless terminal, whereas handover component 950 is configured to perform a handover based on the measurement event occurrence associated with the measurement report and the cell selection scheme ascertained by scheme component 940. Here, it should be noted that cell selection schemes ascertained by scheme component 940 indicate a set of serving cells associated with the wireless terminal from which the at least one serving cell was selected, as well as a set of non-serving cells from which the at least one non-serving cell was selected.

In an aspect, base station 900 facilitates horizontal handovers. For instance, scheme component 940 may be configured to identify a particular cell selection scheme associated with a horizontal handover. In a particular embodiment, a horizontal handover cell selection scheme comprises limiting the at least one serving cell to be a single serving cell associated with a serving frequency, wherein the at least one non-serving cell is associated with the serving frequency. For this embodiment, handover component 950 may be configured to perform a horizontal handover. Here, it should also be noted that communication component 930 may be configured to transmit a measurement configuration to the wireless terminal, wherein the measurement configuration initiates an implementation of the horizontal handover cell selection scheme in the wireless terminal.

In another aspect, base station 900 facilitates vertical handovers. For instance, scheme component 940 may be configured to identify a particular cell selection scheme associated with a vertical handover. In a particular embodiment, scheme component 940 is configured to identify a vertical handover cell selection scheme in which the at least one serving cell is selected from any of the set of serving cells, wherein the at least one non-serving cell is selected from any of the set of non-serving cells associated with a non-serving frequency. Within such embodiment, handover component 950 may be configured to perform a vertical handover. Here, it should also be noted that, rather than selecting the at least one non-serving cell from any of the set of non-serving cells, a vertical handover cell selection scheme may comprise limiting the at least one non-serving cell to be selected from a pre-determined subset of the set of non-serving cells.

Figure 10:
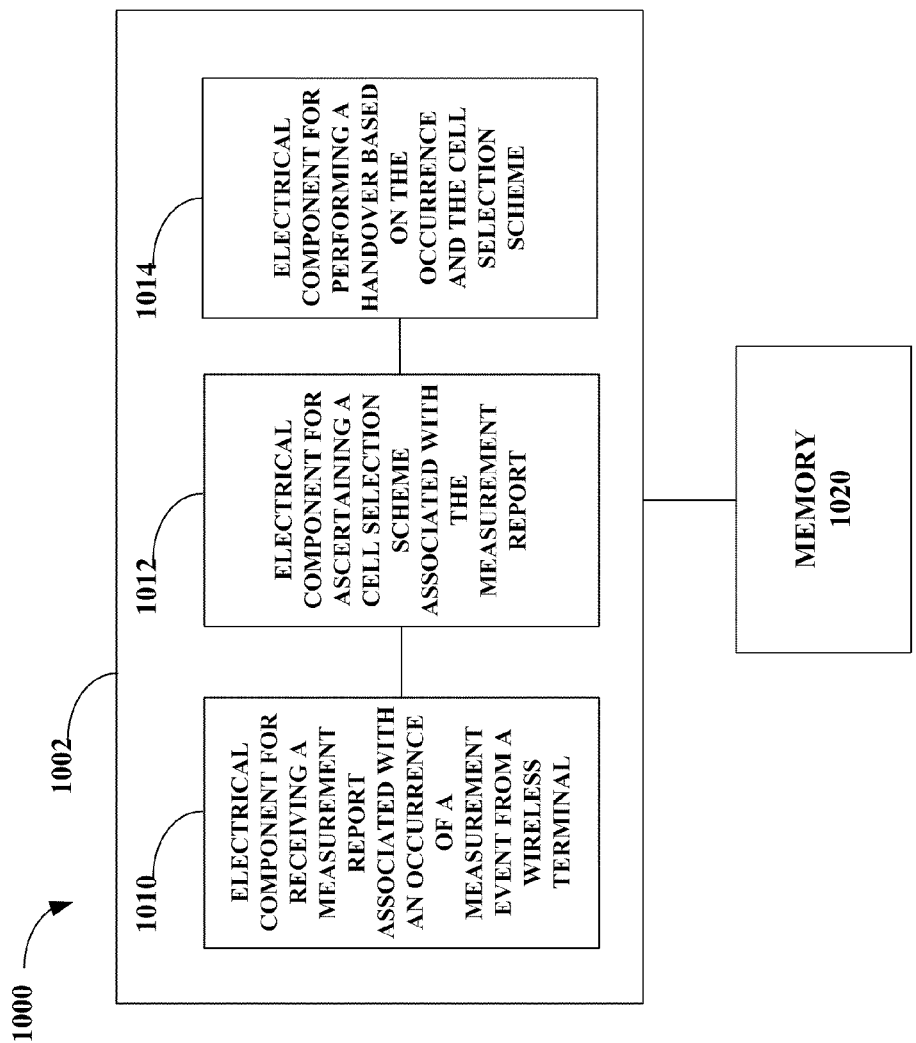
FIG. 10 is an illustration of an exemplary coupling of electrical components that effectuate performing handovers in multicarrier operation.

Referring next to FIG. 10, illustrated is a system 1000 that facilitates performing handovers in multicarrier operation according to an embodiment. System 1000 and/or instructions for implementing system 1000 can reside within a network entity (e.g., base station 900) or a computer-readable storage medium, for instance, wherein system 1000 includes functional blocks that can represent functions implemented by a processor, software, or combination thereof (e.g., firmware). Moreover, system 1000 includes a logical grouping 1002 of electrical components that can act in conjunction similar to logical grouping 702 in system 700. As illustrated, logical grouping 1002 can include an electrical component for receiving a measurement report associated with an occurrence of a measurement event from a wireless terminal 1010. Logical grouping 1002 can also include an electrical component for ascertaining a cell selection scheme associated with the measurement report 1012. Further, logical grouping 1002 can include an electrical component for performing a handover based on the occurrence and the cell selection scheme 1014. Additionally, system 1000 can include a memory 1020 that retains instructions for executing functions associated with electrical components 1010, 1012, and 1014. While shown as being external to memory 1020, it is to be understood that electrical components 1010, 1012, and 1014 can exist within memory 1020.

Figure 11:
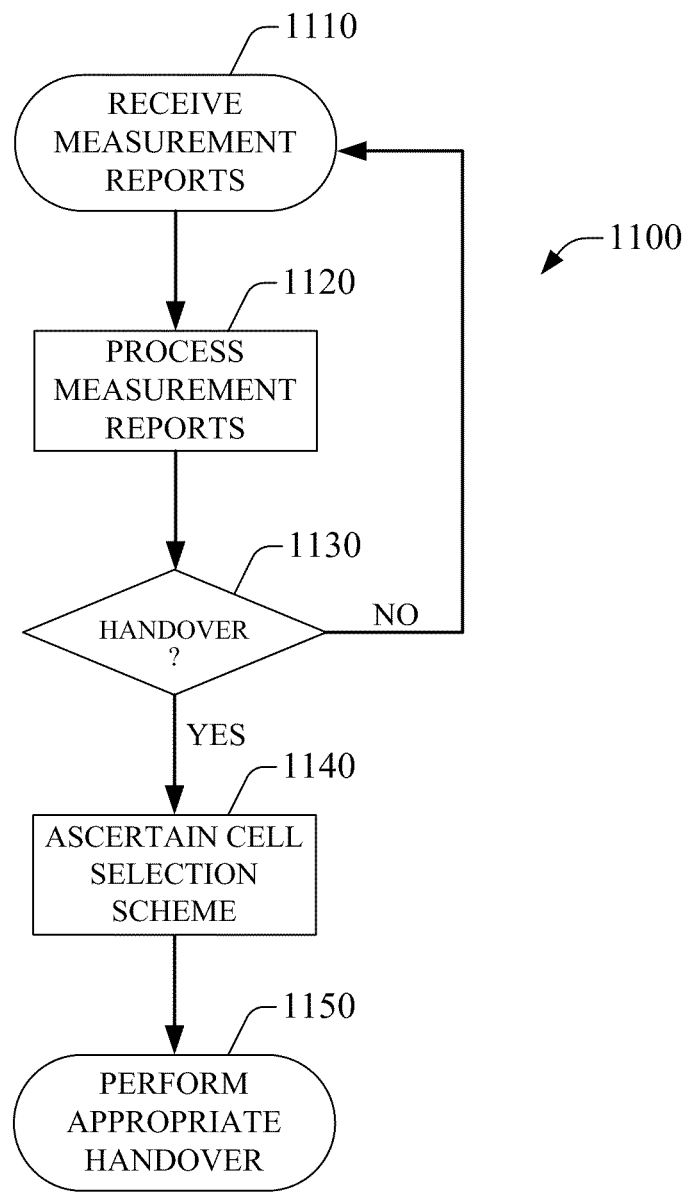
FIG. 11 is a flow chart illustrating an exemplary methodology that facilitates performing handovers in multicarrier operation in accordance with an aspect of the subject specification.

Referring next to FIG. 11, a flow chart illustrating an exemplary method for facilitating performing handovers in multi-carrier operation is provided. As illustrated, process 1100 includes a series of acts that may be performed by various components of a network entity (e.g., base station 900) according to an aspect of the subject specification. Process 1100 may be implemented by employing at least one processor to execute computer executable instructions stored on a computer readable storage medium to implement the series of acts. In another embodiment, a computer-readable storage medium comprising code for causing at least one computer to implement the acts of process 1100 are contemplated.

In an aspect, process 1100 begins with measurement reports being received from any of a plurality of wireless terminals at act 1110. Here, it is noted that such measurement reports identify an occurrence of a measurement event from a wireless terminal, wherein the measurement event is based on a comparison between a first measurement associated with at least one serving cell and a second measurement associated with at least one non-serving cell.

Next, at act 1120, the received measurement reports are processed, wherein a subsequent determination of whether to perform a handover based on such processing is made at act 1130. If no handover is desired, process 1100 loops back to act 1110 where measurement reports continue to be received. However, if a handover is indeed desired, process 1100 proceeds to act 1140 where the particular cell selection scheme associated with the received measurement report is ascertained. In an aspect, such cell selection scheme could correspond to a vertical handover determination or a horizontal handover determination. Once the cell selection scheme is ascertained, process 1100 concludes at act 1150 where the appropriate handover is performed.

In multicarrier operation, it should be noted that often times the bandwidth constituted by carriers assigned to the UE is less than the reception bandwidth the UE is capable of. In this scenario, part of the inter-frequency measurement can be performed without assistance of a measurement gap (i.e. a radio frequency tune away).

Figure 12:
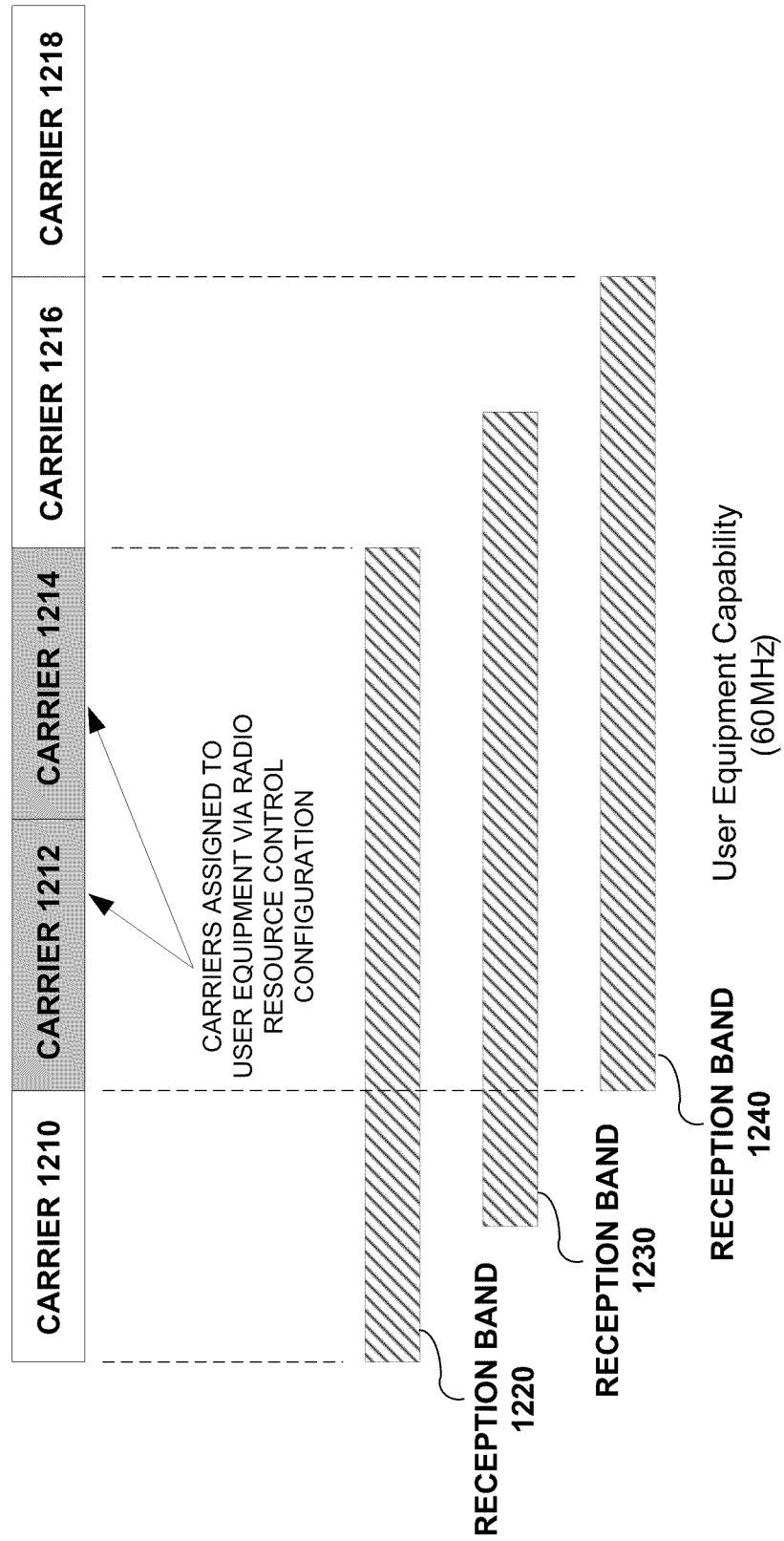
FIG. 12 illustrates exemplary reception band placements according to an embodiment.

Referring next to FIG. 12, an example such scenario is provided where the UE capable reception bandwidth is 60 MHz and the UE is assigned two component carriers of 20 MHz. Specifically, the system bandwidth includes carriers 1210, 1212, 1214, 1216, and 1218, wherein carriers 1212 and 1214 are assigned to the UE via a radio resource configuration. In an aspect, it should be noted that the system band may not be contiguous. As shown, various candidate reception bands 1220, 1230, and 1230, are provided, wherein some non-serving frequencies (i.e., carriers 1210, 1216, and 1218) can fall into the UE reception band, depending on the placement of the center of the UE reception band. Here, similar to the system band, it should be noted that the UE reception band may not be contiguous if, for example, the UE is equipped with multiple radio frequency chains.

In an aspect, the network is made aware of the UE reception band placement so that it can determine whether to configure a measurement gap for a inter-frequency measurement. Here, it is noted that it may sometimes be desirable for the network to configure the placement of the UE reception band, since it better knows the frequency deployment of the network than the UE. The network is also aware of the UE reception capability. Accordingly, in an exemplary embodiment, the placement of the UE reception band with respect to the assigned component carrier(s) is configured by the network.

In another aspect, the UE can decide the reception band placement based on available knowledge in the UE (e.g. neighbor frequencies in the measurement configuration). Within such embodiment, such placement decision can be communicated to the network so that the network can configure the measurement gap appropriately. Accordingly, in another exemplary embodiment, the placement of the UE reception band with respect to the assigned component carriers) is decided by the UE, wherein such placement is communicated from the UE to the network.

Figure 13:
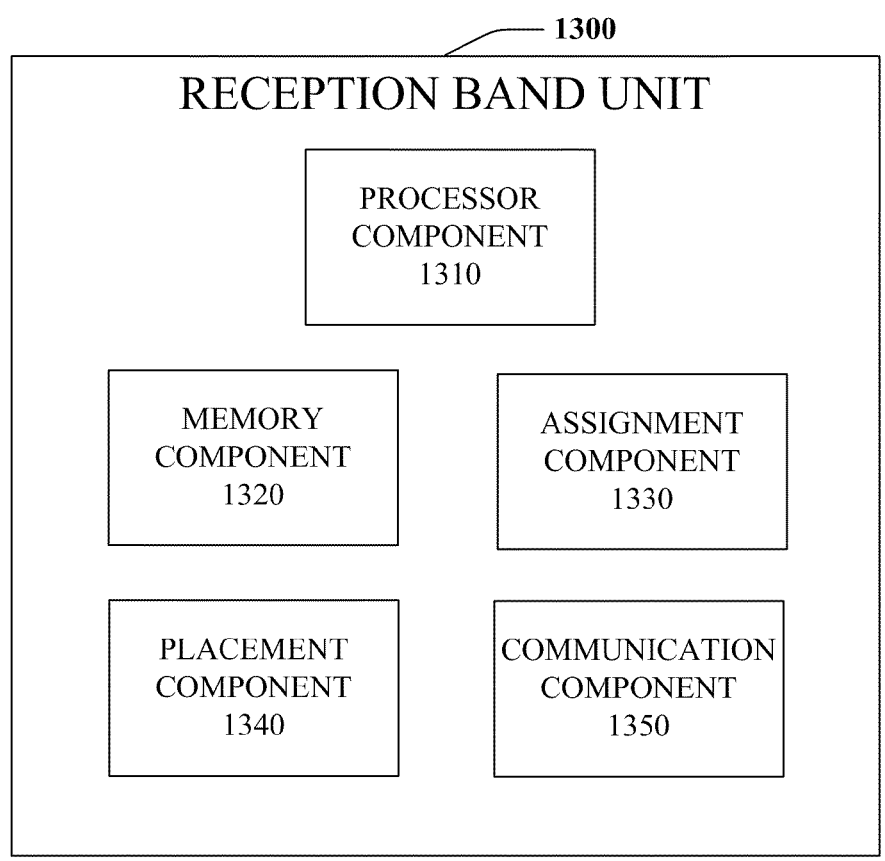
FIG. 13 illustrates a block diagram of an exemplary reception band unit that facilitates placing a reception band in accordance with an aspect of the subject specification.

Referring next to FIG. 13, a block diagram illustrates an exemplary reception band unit that facilitates placing a reception band in accordance with various aspects. As illustrated, reception band unit 1300 may include processor component 1310, memory component 1320, assignment component 1330, placement component 1340, and communication component 1350.

Similar to processor components 610 and 910 in wireless terminal 600 and base station 900, respectively, processor component 1310 is configured to execute computer-readable instructions related to performing any of a plurality of functions. Processor component 1310 can be a single processor or a plurality of processors dedicated to analyzing information to be communicated from reception band unit 1300 and/or generating information that can be utilized by memory component 1320, assignment component 1330, placement component 1340, and/or communication component 1350. Additionally or alternatively, processor component 1310 may be configured to control one or more components of reception band unit 1300.

In another aspect, memory component 1320 is coupled to processor component 1310 and configured to store computer-readable instructions executed by processor component 1310. Memory component 1320 may also be configured to store any of a plurality of other types of data including data generated by any of assignment component 1330, placement component 1340, and/or communication component 1350. Here, it should be noted that memory component 1320 is analogous to memory components 620 and 920 in wireless terminal 600 and base station 900, respectively. Accordingly, it should be appreciated that any of the aforementioned features/configurations of memory components 620 and 920 are also applicable to memory component 1320.

As illustrated, reception band unit 1300 may also include assignment component 1330 and placement component 1340. Within such embodiment, assignment component 1330 is configured to identify at least one assigned component carrier from a plurality of component carriers within a system bandwidth, whereas placement component 1340 is configured to ascertain a placement of the reception band within the system bandwidth. For this embodiment, the placement is configured to overlap with at least a portion of the at least one assigned component carrier.

In a first aspect, placement component 1340 resides within a network entity (e.g., base station 900) and is configured to determine the placement of the reception band from within the network entity. Within such embodiment, it is contemplated that placement component 1340 may be configured to determine a need for a measurement gap configuration based on the placement. For this embodiment, communication component 1350 may then be configured to transmit the measurement gap configuration to a wireless terminal (e.g., wireless terminal 600) in response to the need for the measurement gap configuration.

In another aspect, placement component 1340 resides within a wireless terminal (e.g., wireless terminal 600) and is configured to determine the placement of the reception band from within the wireless terminal. Within such embodiment, communication component 1350 may be configured to communicate the placement to a network entity (e.g., base station 900). Here, it should be appreciated that placement component 1340 may be further configured to determine a need for a measurement gap configuration based on the placement, wherein communication component 1350 is configured to receive the measurement gap configuration in response to the need for the measurement gap configuration.

Figure 14:
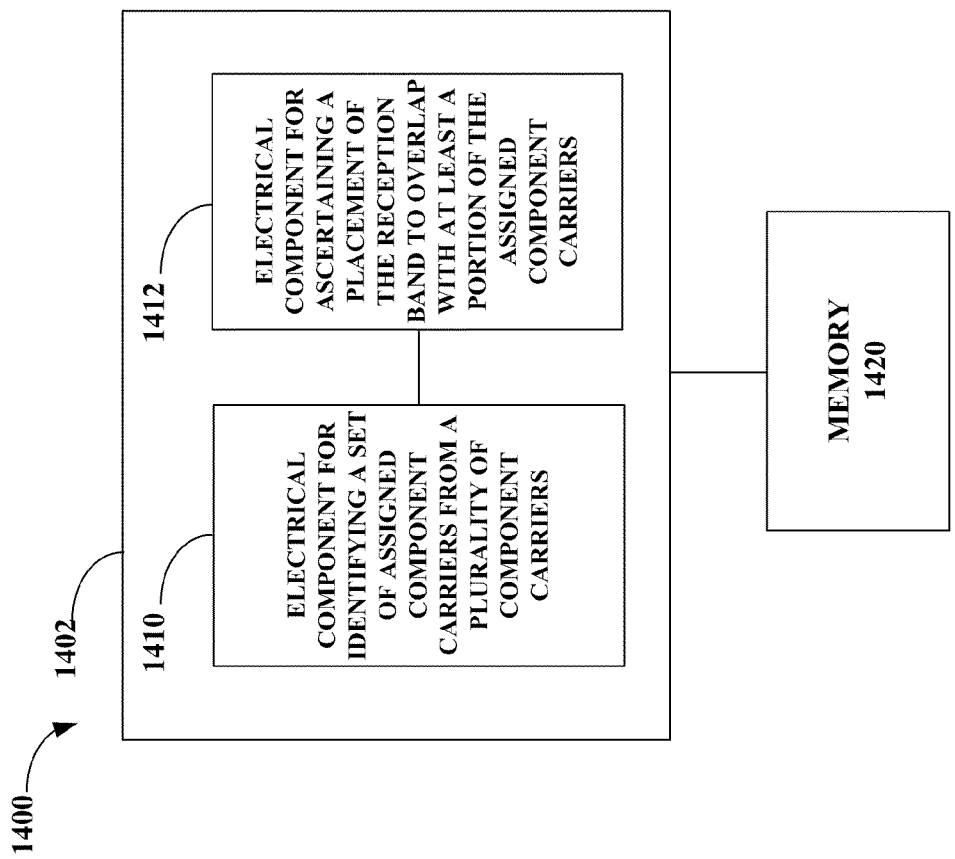
FIG. 14 is an illustration of an exemplary coupling of electrical components that effectuate placing a reception band.

Referring next to FIG. 14, illustrated is another system 1400 that facilitates placing a reception band according to an embodiment. System 1400 and/or instructions for implementing system 1400 can reside within a computing device (e.g., reception band unit 1300) or a computer-readable storage medium, for instance, wherein system 1400 includes functional blocks that can represent functions implemented by a processor, software, or combination thereof (e.g., firmware). Moreover, system 1400 includes a logical grouping 1402 of electrical components that can act in conjunction similar to logical groupings 702 and 1002 in systems 700 and 1000, respectively. As illustrated, logical grouping 1402 can include an electrical component for identifying a set of assigned component carriers from a plurality of component carriers 1410. Logical grouping 1402 can also include an electrical component for ascertaining a placement of the reception band to overlap with at least a portion of the assigned component carriers 1412. Additionally, system 1400 can include a memory 1420 that retains instructions for executing functions associated with electrical components 1410 and 1412, wherein any of electrical components 1410 and 1412 can exist either within or outside memory 1420.

Figure 15:
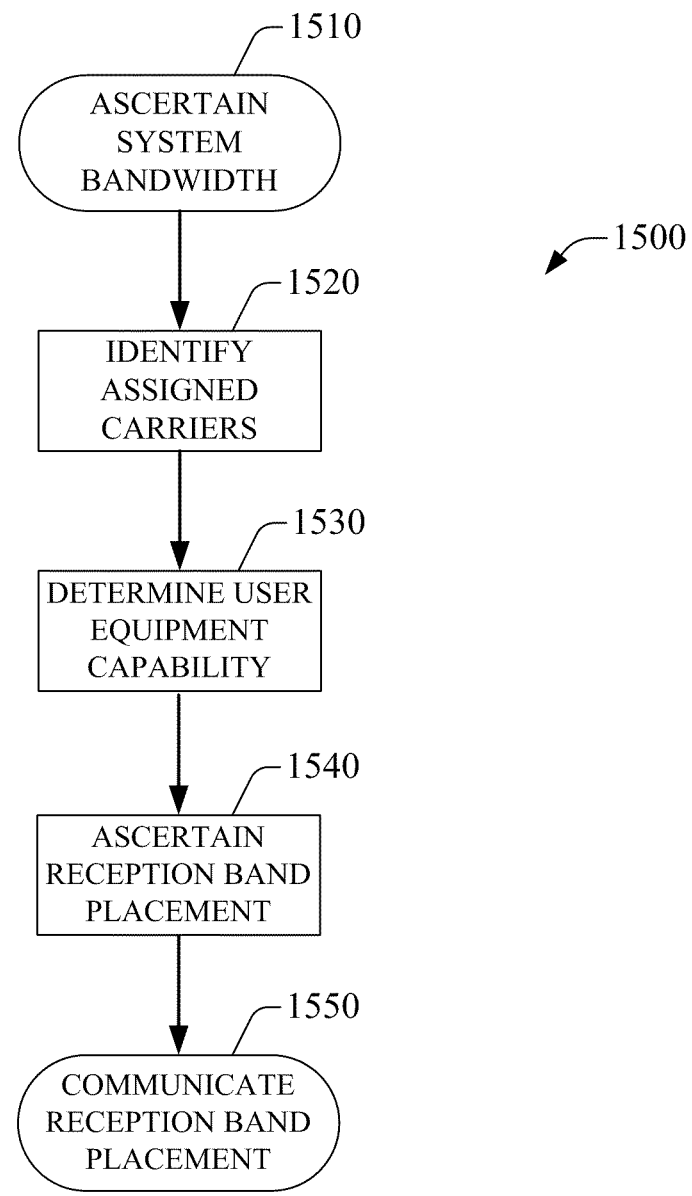
FIG. 15 is flow chart illustrating an exemplary methodology that facilitates placing a reception band in accordance with an aspect of the subject specification.

Referring next to FIG. 15, a flow chart illustrating an exemplary method that facilitates placing a reception band is provided. As illustrated, process 1500 includes a series of acts that may be performed by various components of a computing device (e.g., reception band unit 1300) according to an aspect of the subject specification. Process 1500 may be implemented by employing at least one processor to execute computer executable instructions stored on a computer readable storage medium to implement the series of acts. In another embodiment, a computer-readable storage medium comprises code, wherein such code causes at least one computer to implement the acts of process 1500.

In an aspect, process 1500 begins with a system bandwidth being ascertained at act 1510, wherein such bandwidth spans a plurality of carriers. Next, at act 1520, the particular carriers assigned to a user equipment are identified. Process 1500 then proceeds to act 1530 where the user equipment capability is determined. As stated previously, the bandwidth constituted by carriers assigned to the user equipment is often times less than the reception bandwidth the user equipment is capable of. Accordingly, strategic placement of the user equipment's reception band is then ascertained at act 1540.

Once the placement of the user equipment's reception band is ascertained process 1500 concludes by communicating such placement at act 1550. Here, however, because process 1500 (or portions thereof) may be performed by either a user equipment or the network, it should be noted that the communication at act 1550 may differ. For instance, if process 1500 is performed by the user equipment, act 1550 may include communicating the placement ascertained by the user equipment to the network. However, if process 1500 is performed by the network, act 1550 may include communicating the placement to the user equipment for implementation.

Exemplary Communication System

Figure 16:
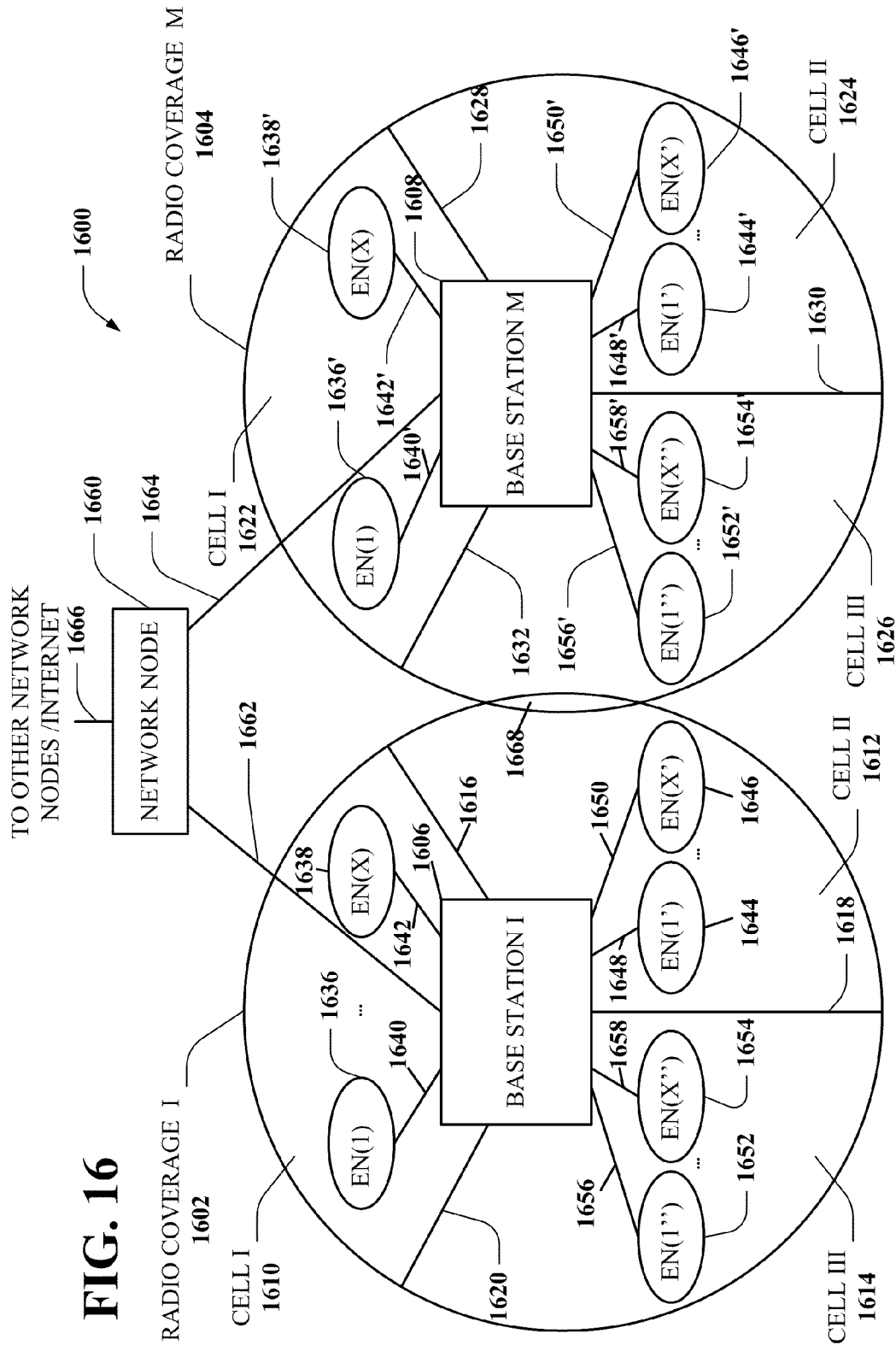
FIG. 16 is an illustration of an exemplary communication system implemented in accordance with various aspects including multiple cells.

Referring next to FIG. 16, an exemplary communication system 1600 implemented in accordance with various aspects is provided including multiple radio coverage areas, wherein each radio coverage area corresponds to a radio coverage of cells from a single base station. As illustrated, system 1600 may include radio coverage I 1602, radio coverage M 1604. Here, it should be noted that adjacent radio coverages 1602, 1604 overlap slightly, as indicated by boundary region 1668, thereby creating potential for signal interference between signals transmitted by base stations in neighboring cells. Each radio coverage 1602, 1604 of system 1600 includes three cells. Radio coverages which have not been subdivided into multiple cells (N=1), radio coverages with two cells (N=2) and radio coverages with more than 3 cells (N>3) are also possible in accordance with various aspects. Radio coverage 1602 includes a first cell, cell I 1610, a second cell, cell II 1612, and a third cell, cell III 1614. Each cell 1610, 1612, and 1614 has two cell boundary regions; each boundary region is shared between two adjacent cells.

Cell boundary regions provide potential for signal interference between signals transmitted by base stations in neighboring cells. Line 1616 represents a cell boundary region between cell I 1610 and cell II 1612; line 1618 represents a cell boundary region between cell II 1612 and cell III 1614; line 1620 represents a cell boundary region between cell III 1614 and cell I 1610. Similarly, radio coverage M 1604 includes a first cell, cell I 1622, a second cell, cell II 1624, and a third cell, cell III 1626. Line 1628 represents a cell boundary region between cell I 1622 and cell II 1624; line 1630 represents a cell boundary region between cell II 1624 and cell III 1626; line 1632 represents a boundary region between cell III 1626 and cell I 1622. Radio coverage I 1602 includes a base station (BS), base station I 1606, and a plurality of end nodes (ENs) in each cell 1610, 1612, 1614. Cell I 1610 includes EN(1) 1636 and EN(X) 1638 coupled to BS 1606 via wireless links 1640, 1642, respectively; cell II 1612 includes EN(1') 1644 and EN(X') 1646 coupled to BS 1606 via wireless links 1648, 1650, respectively; cell III 1614 includes EN(1") 1652 and EN(X") 1654 coupled to BS 1606 via wireless links 1656, 1658, respectively. Similarly, radio coverage M 1604 includes base station M 1608, and a plurality of end nodes (ENs) in each cell 1622, 1624, and 1626. Cell I 1622 includes EN(1) 1636' and EN(X) 1638' coupled to BS M 1608 via wireless links 1640', 1642', respectively; cell II 1624 includes EN(1') 1644' and EN(X') 1646' coupled to BS M 1608 via wireless links 1648', 1650', respectively; cell III 1626 includes EN(1") 1652' and EN(X") 1654' coupled to BS 1608 via wireless links 1656', 1658', respectively.

System 1600 also includes a network node 1660 which is coupled to BS I 1606 and BS M 1608 via network links 1662, 1664, respectively. Network node 1660 is also coupled to other network nodes, e.g., other base stations, AAA server nodes, intermediate nodes, routers, etc. and the Internet via network link 1666. Network links 1662, 1664, 1666 may be, e.g., fiber optic cables. Each end node, e.g. EN 1 1636 may be a wireless terminal including a transmitter as well as a receiver. The wireless terminals, e.g., EN(1) 1636 may move through system 1600 and may communicate via wireless links with the base station in the radio coverage in which the EN is currently located. The wireless terminals, (WTs), e.g. EN(1) 1636, may communicate with peer nodes, e.g., other WTs in system 1600 or outside system 1600 via a base station, e.g. BS 1606, and/or network node 1660. WTs, e.g., EN(1) 1636 may be mobile communications devices such as cell phones, personal data assistants with wireless modems, etc. Respective base stations perform tone subset allocation using a different method for the strip-symbol periods, from the method employed for allocating tones and determining tone hopping in the rest symbol periods, e.g., non strip-symbol periods. The wireless terminals use the tone subset allocation method along with information received from the base station, e.g., base station slope ID, cell ID information, to determine tones that they can employ to receive data and information at specific strip-symbol periods. The tone subset allocation sequence is constructed, in accordance with various aspects to spread inter-cell and inter-radio coverage interference across respective tones. Although the subject system was described primarily within the context of cellular mode, it is to be appreciated that a plurality of modes may be available and employable in accordance with aspects described herein.

Exemplary Base Station

Figure 17:
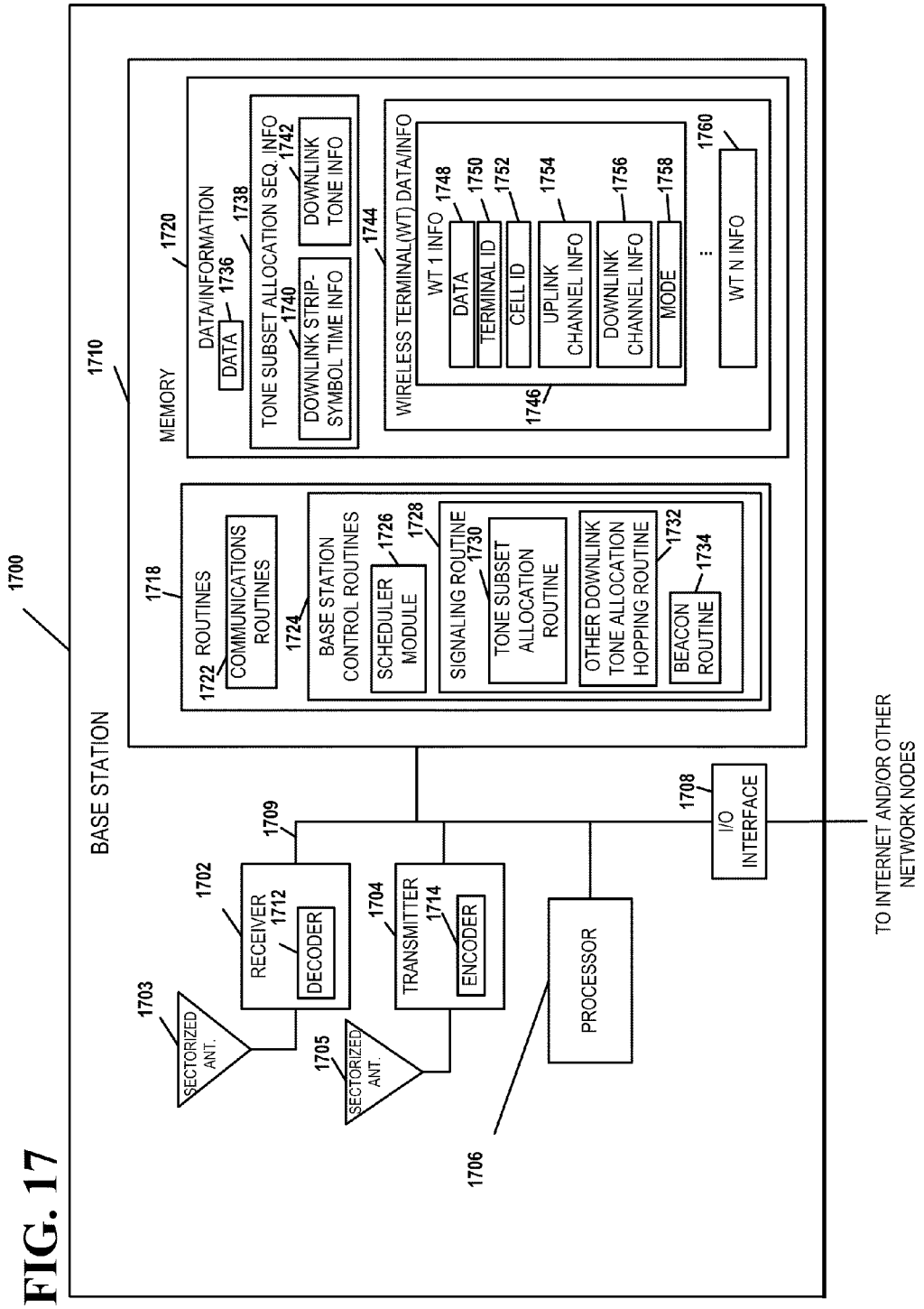
FIG. 17 is an illustration of an exemplary base station in accordance with various aspects described herein.

FIG. 17 illustrates an example base station 1700 in accordance with various aspects. Base station 1700 implements tone subset allocation sequences, with different tone subset allocation sequences generated for respective different cell types of the radio coverage. Base station 1700 may be used as any one of base stations 1606, 1608 of the system 1600 of FIG. 16. The base station 1700 includes a receiver 1702, a transmitter 1704, a processor 1706, e.g., CPU, an input/output interface 1708 and memory 1710 coupled together by a bus 1709 over which various elements 1702, 1704, 1706, 1708, and 1710 may interchange data and information.

Sectorized antenna 1703 coupled to receiver 1702 is used for receiving data and other signals, e.g., channel reports from wireless terminal transmissions from each cell within the base station's radio coverage. Sectorized antenna 1705 coupled to transmitter 1704 is used for transmitting data and other signals, e.g., control signals, pilot signal, beacon signals, etc. to wireless terminals 1800 (see FIG. 18) within each cell of the base station's radio coverage. In various aspects, base station 1700 may employ multiple receivers 1702 and multiple transmitters 1704, e.g., an individual receiver 1702 for each cell and an individual transmitter 1704 for each cell. Processor 1706, may be, e.g., a general purpose central processing unit (CPU). Processor 1706 controls operation of base station 1700 under direction of one or more routines 1718 stored in memory 1710 and implements the methods. I/O interface 1708 provides a connection to other network nodes, coupling the BS 1700 to other base stations, access routers, AAA server nodes, etc., other networks, and the Internet. Memory 1710 includes routines 1718 and data/information 1720.

Data/information 1720 includes data 1736, tone subset allocation sequence information 1738 including downlink strip-symbol time information 1740 and downlink tone information 1742, and wireless terminal (WT) data/info 1744 including a plurality of sets of WT information: WT 1 info 1746 and WT N info 1760. Each set of WT info, e.g., WT 1 info 1746 includes data 1748, terminal ID 1750, cell ID 1752, uplink channel information 1754, downlink channel information 1756, and mode information 1758.

Routines 1718 include communications routines 1722 and base station control routines 1724. Base station control routines 1724 includes a scheduler module 1726 and signaling routines 1728 including a tone subset allocation routine 1730 for strip-symbol periods, other downlink tone allocation hopping routine 1732 for the rest of symbol periods, e.g., non strip-symbol periods, and a beacon routine 1734.

Data 1736 includes data to be transmitted that will be sent to encoder 1714 of transmitter 1704 for encoding prior to transmission to WTs, and received data from WTs that has been processed through decoder 1712 of receiver 1702 following reception. Downlink strip-symbol time information 1740 includes the frame synchronization structure information, such as the superslot, beaconslot, and ultraslot structure information and information specifying whether a given symbol period is a strip-symbol period, and if so, the index of the strip-symbol period and whether the strip-symbol is a resetting point to truncate the tone subset allocation sequence used by the base station. Downlink tone information 1742 includes information including a carrier frequency assigned to the base station 1700, the number and frequency of tones, and the set of tone subsets to be allocated to the strip-symbol periods, and other radio coverage and cell specific values such as slope, slope index and cell type.

Data 1748 may include data that WT1 1800 has received from a peer node, data that WT 1 1800 desires to be transmitted to a peer node, and downlink channel quality report feedback information. Terminal ID 1750 is a base station 1700 assigned ID that identifies WT 1 1800. Cell ID 1752 includes information identifying the cell in which WT1 1800 is operating. Cell ID 1752 can be used, for example, to determine the cell type. Uplink channel information 1754 includes information identifying channel segments that have been allocated by scheduler 1726 for WT1 1800 to use, e.g., uplink traffic channel segments for data, dedicated uplink control channels for requests, power control, timing control, etc. Each uplink channel assigned to WT1 1800 includes one or more logical tones, each logical tone following an uplink hopping sequence. Downlink channel information 1756 includes information identifying channel segments that have been allocated by scheduler 1726 to carry data and/or information to WT1 1800, e.g., downlink traffic channel segments for user data. Each downlink channel assigned to WT1 1800 includes one or more logical tones, each following a downlink hopping sequence. Mode information 1758 includes information identifying the state of operation of WT1 1800, e.g. sleep, hold, on.

Communications routines 1722 control the base station 1700 to perform various communications operations and implement various communications protocols. Base station control routines 1724 are used to control the base station 1700 to perform basic base station functional tasks, e.g., signal generation and reception, scheduling, and to implement the steps of the method of some aspects including transmitting signals to wireless terminals using the tone subset allocation sequences during the strip-symbol periods.

Signaling routine 1728 controls the operation of receiver 1702 with its decoder 1712 and transmitter 1704 with its encoder 1714. The signaling routine 1728 is responsible controlling the generation of transmitted data 1736 and control information. Tone subset allocation routine 1730 constructs the tone subset to be used in a strip-symbol period using the method of the aspect and using data/info 1720 including downlink strip-symbol time info 1740 and cell ID 1752. The downlink tone subset allocation sequences will be different for each cell type in a radio coverage and different for adjacent radio coverages. The WTs 1800 receive the signals in the strip-symbol periods in accordance with the downlink tone subset allocation sequences; the base station 1700 uses the same downlink tone subset allocation sequences in order to generate the transmitted signals. Other downlink tone allocation hopping routine 1732 constructs downlink tone hopping sequences, using information including downlink tone information 1742, and downlink channel information 1756, for the symbol periods other than the strip-symbol periods. The downlink data tone hopping sequences are synchronized across the cells of a radio coverage. Beacon routine 1734 controls the transmission of a beacon signal, e.g., a signal of relatively high power signal concentrated on one or a few tones, which may be used for synchronization purposes, e.g., to synchronize the frame timing structure of the downlink signal and therefore the tone subset allocation sequence with respect to an ultra-slot boundary.

Exemplary Wireless Terminal

Figure 18:
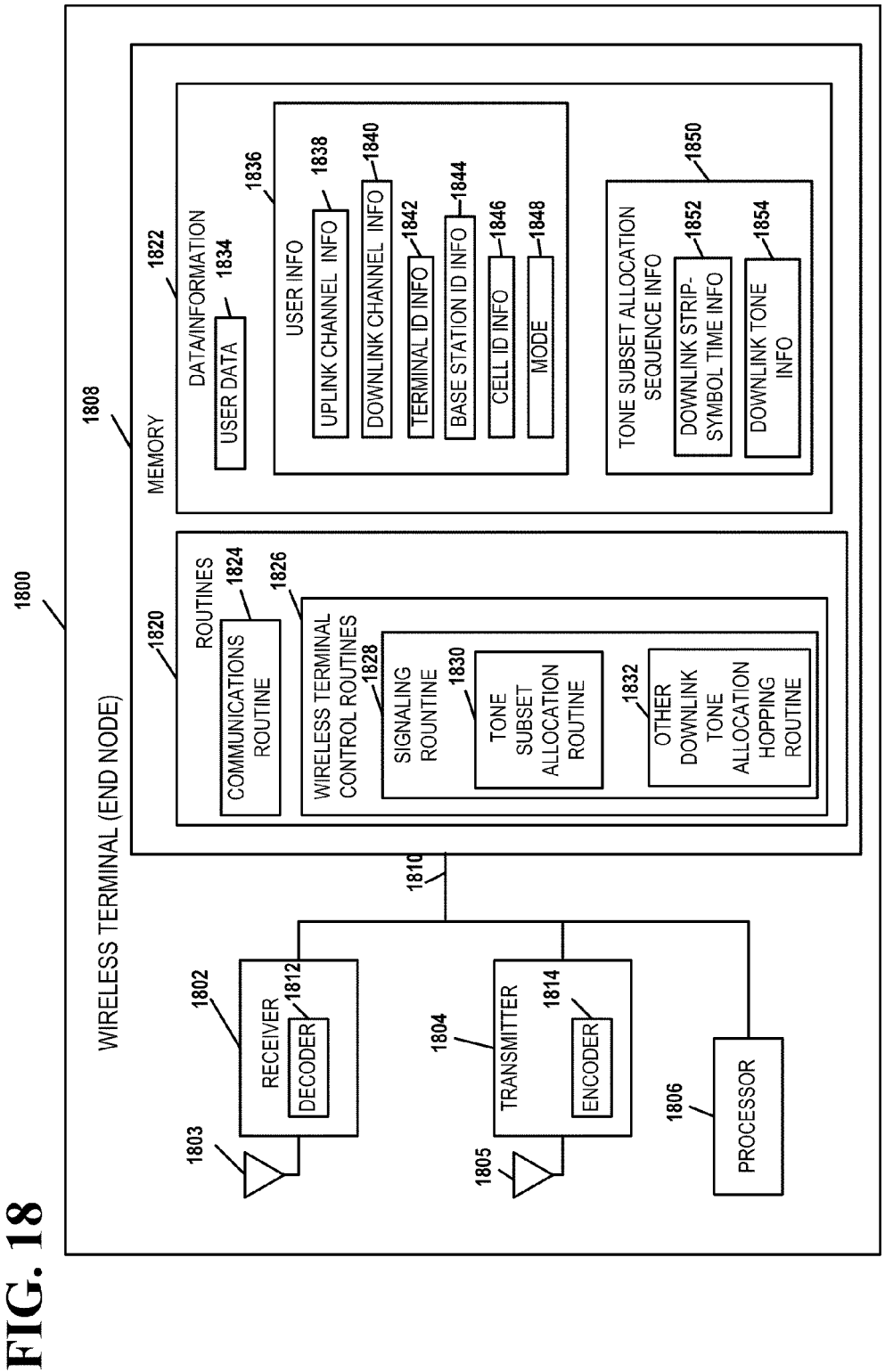
FIG. 18 is an illustration of an exemplary wireless terminal implemented in accordance with various aspects described herein.

FIG. 18 illustrates an example wireless terminal (end node) 1800 which can be used as any one of the wireless terminals (end nodes), e.g., EN(1) 1636, of the system 1600 shown in FIG. 16. Wireless terminal 1800 implements the tone subset allocation sequences. The wireless terminal 1800 includes a receiver 1802 including a decoder 1812, a transmitter 1804 including an encoder 1814, a processor 1806, and memory 1808 which are coupled together by a bus 1810 over which the various elements 1802, 1804, 1806, 1808 can interchange data and information. An antenna 1803 used for receiving signals from a base station (and/or a disparate wireless terminal) is coupled to receiver 1802. An antenna 1805 used for transmitting signals, e.g., to a base station (and/or a disparate wireless terminal) is coupled to transmitter 1804.

The processor 1806, e.g., a CPU controls the operation of the wireless terminal 1800 and implements methods by executing routines 1820 and using data/information 1822 in memory 1808.

Data/information 1822 includes user data 1834, user information 1836, and tone subset allocation sequence information 1850. User data 1834 may include data, intended for a peer node, which will be routed to encoder 1814 for encoding prior to transmission by transmitter 1804 to a base station, and data received from the base station which has been processed by the decoder 1812 in receiver 1802. User information 1836 includes uplink channel information 1838, downlink channel information 1840, terminal ID information 1842, base station ID information 1844, cell ID information 1846, and mode information 1848. Uplink channel information 1838 includes information identifying uplink channels segments that have been assigned by a base station for wireless terminal 1800 to use when transmitting to the base station. Uplink channels may include uplink traffic channels, dedicated uplink control channels, e.g., request channels, power control channels and timing control channels. Each uplink channel includes one or more logic tones, each logical tone following an uplink tone hopping sequence. The uplink hopping sequences are different between each cell type of a radio coverage and between adjacent radio coverages. Downlink channel information 1840 includes information identifying downlink channel segments that have been assigned by a base station to WT 1800 for use when the base station is transmitting data/information to WT 1800. Downlink channels may include downlink traffic channels and assignment channels, each downlink channel including one or more logical tone, each logical tone following a downlink hopping sequence, which is synchronized between each cell of the radio coverage.

User info 1836 also includes terminal ID information 1842, which is a base station-assigned identification, base station ID information 1844 which identifies the specific base station that WT has established communications with, and cell ID info 1846 which identifies the specific cell of the radio coverage where WT 1800 is presently located. Base station ID 1844 provides a cell slope value and cell ID info 1846 provides a cell index type; the cell slope value and cell index type may be used to derive tone hopping sequences. Mode information 1848 also included in user info 1836 identifies whether the WT 1800 is in sleep mode, hold mode, or on mode.

Tone subset allocation sequence information 1850 includes downlink strip-symbol time information 1852 and downlink tone information 1854. Downlink strip-symbol time information 1852 include the frame synchronization structure information, such as the superslot, beaconslot, and ultraslot structure information and information specifying whether a given symbol period is a strip-symbol period, and if so, the index of the strip-symbol period and whether the strip-symbol is a resetting point to truncate the tone subset allocation sequence used by the base station. Downlink tone info 1854 includes information including a carrier frequency assigned to the base station, the number and frequency of tones, and the set of tone subsets to be allocated to the strip-symbol periods, and other radio coverage and cell specific values such as slope, slope index and cell type.

Routines 1820 include communications routines 1824 and wireless terminal control routines 1826. Communications routines 1824 control the various communications protocols used by WT 1800. Wireless terminal control routines 1826 controls basic wireless terminal 1800 functionality including the control of the receiver 1802 and transmitter 1804. Wireless terminal control routines 1826 include the signaling routine 1828. The signaling routine 1828 includes a tone subset allocation routine 1830 for the strip-symbol periods and an other downlink tone allocation hopping routine 1832 for the rest of symbol periods, e.g., non strip-symbol periods. Tone subset allocation routine 1830 uses user data/info 1822 including downlink channel information 1840, base station ID info 1844, e.g., slope index and cell type, and downlink tone information 1854 in order to generate the downlink tone subset allocation sequences in accordance with some aspects and process received data transmitted from the base station. Other downlink tone allocation hopping routine 1830 constructs downlink tone hopping sequences, using information including downlink tone information 1854, and downlink channel information 1840, for the symbol periods other than the strip-symbol periods. Tone subset allocation routine 1830, when executed by processor 1806, is used to determine when and on which tones the wireless terminal 1800 is to receive one or more strip-symbol signals from the base station 1700. The uplink tone allocation hopping routine 1830 uses a tone subset allocation function, along with information received from the base station, to determine the tones in which it should transmit on.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

When the embodiments are implemented in program code or code segments, it should be appreciated that a code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc. Additionally, in some aspects, the steps and/or actions of a method or algorithm can reside as one or any combination or set of codes and/or instructions on a machine readable medium and/or computer readable medium, which can be incorporated into a computer program product.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Furthermore, as used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

What is claimed is:

1. A method that facilitates performing measurements in multicarrier operation, the method comprising:
    determining a subset of cells from a plurality of cells, wherein the subset of cells includes a serving cell from a plurality of serving cells associated with a wireless terminal, the plurality of serving cells supporting a multicarrier configuration of the wireless terminal, and wherein the subset of cells further includes a non-serving cell from a set of non-serving cells associated with a non-serving frequency;
    obtaining a first measurement associated with the serving cell on a serving frequency and a second measurement associated with the non-serving cell on the non-serving frequency;
    monitoring an occurrence of a measurement event, wherein the measurement event is based on a comparison between the first measurement and the second measurement; and
    transmitting a measurement report, wherein the transmitting is triggered by the occurrence of the measurement event; and
    wherein the monitoring comprises detecting a subsequent occurrence of a first performance parameter associated with the non-serving cell exceeding a second performance parameter associated with any of the plurality of serving cells, and wherein the transmitting further comprises suppressing a subsequent measurement report transmission associated with the subsequent occurrence.

2. The method of claim 1, wherein the determining comprises limiting the non-serving cell to be determined from a pre-determined subset of the set of non-serving cells.

3. The method of claim 1, further comprising identifying the non-serving cell.

4. The method of claim 3, wherein the identifying comprises ascertaining a sector identity from a signal for cell identification.

5. The method of claim 3, wherein the identifying comprises detecting a listing of the non-serving cell in a measurement configuration received from an external entity.

6. An apparatus configured to facilitate performing measurements in multicarrier operation, the apparatus comprising:
    a memory; and
    at least one processor coupled to the memory and configured to execute computer executable components stored in the memory, the components including:
        a selection component configured to determine a subset of cells from a plurality of cells, wherein the subset of cells includes a serving cell from a plurality of serving cells associated with a wireless terminal, the plurality of serving cells supporting a multicarrier configuration of the wireless terminal, and wherein the subset of cells further includes at least one non-serving cell from a set of non-serving cells associated with a non-serving frequency;
        an evaluation component configured to obtain a first measurement associated with the serving cell on a serving frequency and a second measurement associated with the non-serving cell on the non-serving frequency;
        an event component configured to monitor an occurrence of a measurement event, wherein the measurement event is based on a comparison between the first measurement and the second measurement; and
        a communication component configured to transmit a measurement report, wherein the transmitting is triggered by the occurrence of the measurement event; and
    wherein the event component is configured to detect a subsequent occurrence of a first performance parameter associated with the non-serving cell exceeding a second performance parameter associated with any of the plurality of serving cells, and wherein the communication component is configured to suppress a subsequent measurement report transmission associated with the subsequent occurrence.

7. The apparatus of claim 6, wherein the selection component is configured to limit the non-serving cell to be determined from a pre-determined subset of the set of non-serving cells.

8. The apparatus of claim 6, wherein the event component is configured to identify the non-serving cell.

9. The apparatus of claim 8, wherein the event component is configured to ascertain a sector identity from a signal for cell identification.

10. The apparatus of claim 8, wherein the event component is configured to detect a listing of the non-serving cell in a measurement configuration received from an external entity.

11. A non-transitory computer-readable medium storing computer executable code for:
    determining a subset of cells from a plurality of cells, wherein the subset of cells includes a serving cell from a plurality of serving cells associated with a wireless terminal, the plurality of serving cells supporting a multicarrier configuration of the wireless terminal, and wherein the subset of cells further includes a non-serving cell from a set of non-serving cells associated with a non-serving frequency;
    obtaining a first measurement associated with the serving cell on a serving frequency and a second measurement associated with the non-serving cell on the non-serving frequency;
    monitoring an occurrence of a measurement event, wherein the measurement event is based on a comparison between the first measurement and the second measurement; and
    transmitting a measurement report, wherein the transmitting is triggered by the occurrence of the measurement event; and
    detecting a subsequent occurrence of a first performance parameter associated with the non-serving cell exceeding a second performance parameter associated with any of the plurality of serving cells, and wherein a subsequent measurement report transmission associated with the subsequent occurrence is suppressed.

12. The non-transitory computer-readable medium of claim 11, further storing computer executable code for limiting the non-serving cell to be determined from a pre-determined subset of the set of non-serving cells.

13. The non-transitory computer-readable medium of claim 11, further storing computer executable code for identifying the non-serving cell.

14. The non-transitory computer-readable medium of claim 13, further storing computer executable code for ascertaining a sector identity from a signal for cell identification.

15. The non-transitory computer-readable medium of claim 13, further storing computer executable code for detecting a listing of the non-serving cell in a measurement configuration received from an external entity.

16. An apparatus configured to facilitate performing measurements in multicarrier operation, the apparatus comprising:
- means for determining a subset of cells from a plurality of cells, wherein the subset of cells includes a serving cell from a plurality of serving cells associated with a wireless terminal, the plurality of serving cells supporting a multicarrier configuration of the wireless terminal, and wherein the subset of cells further includes a non-serving cell from a set of non-serving cells associated with a non-serving frequency;
- means for obtaining a first measurement associated with the serving cell on a serving frequency and a second measurement associated with the non-serving cell on the non-serving frequency;
- means for monitoring an occurrence of a measurement event, wherein the measurement event is based on a comparison between the first measurement and the second measurement; and
- means for transmitting a measurement report, wherein the transmitting is triggered by the occurrence of the measurement event; and
- wherein the means for monitoring comprises means for detecting a subsequent occurrence of a first performance parameter associated with the non-serving cell exceeding a second performance parameter associated with any of the plurality of serving cells, and wherein the means for transmitting further comprises means for suppressing a subsequent measurement report transmission associated with the subsequent occurrence.

* * * * *